Figure 28:
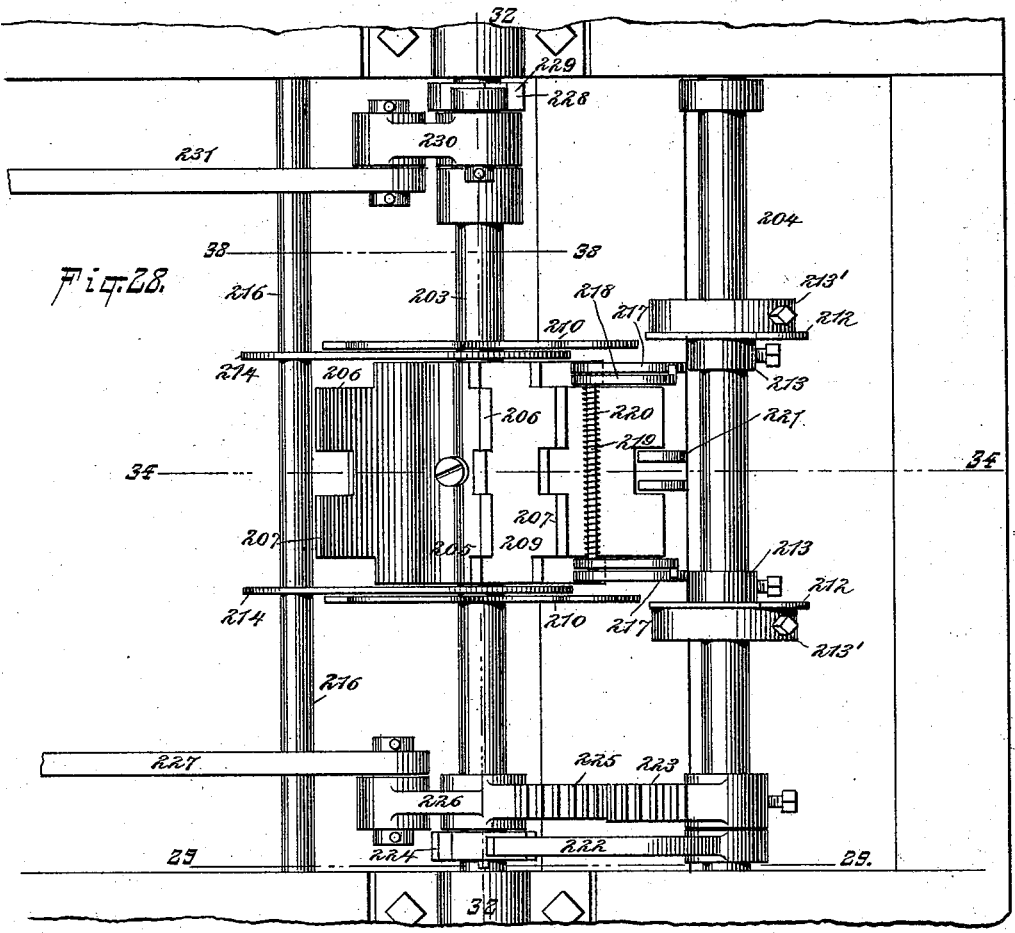

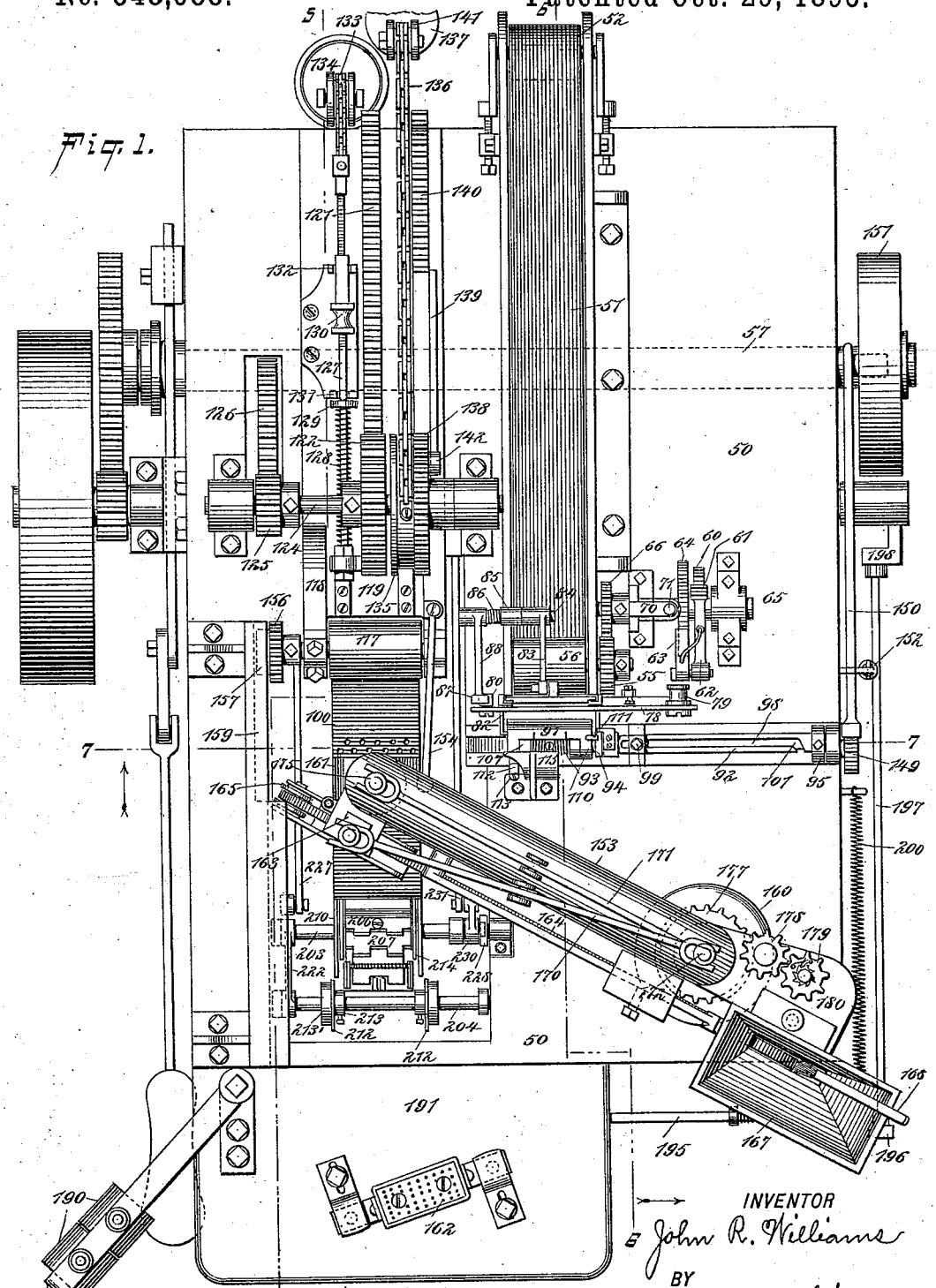

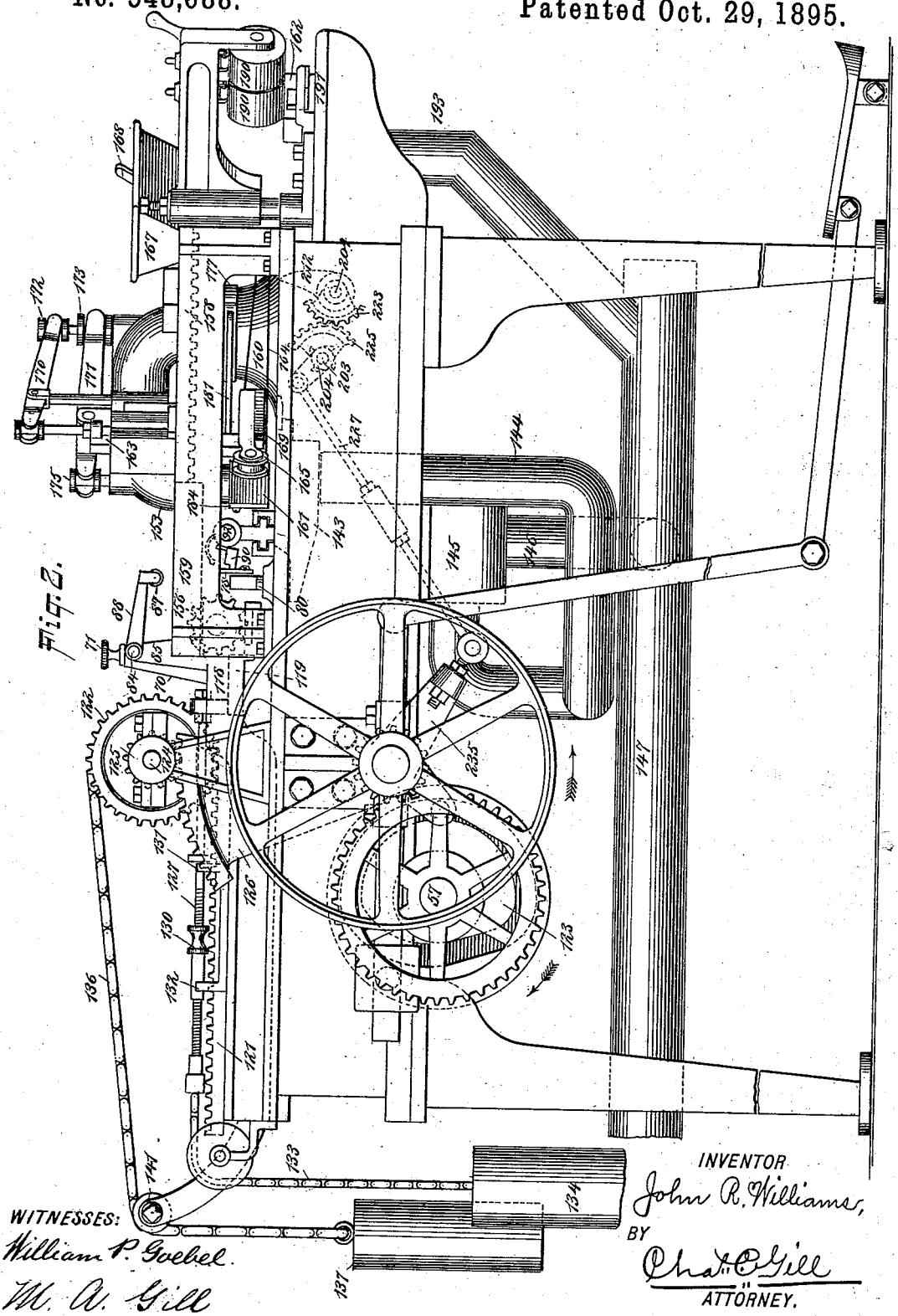

(No Model.) 15 Sheets—Sheet 3.
J. R. WILLIAMS.
MACHINE FOR MAKING CIGARETTES.
No. 548,688. Patented Oct. 29, 1895.
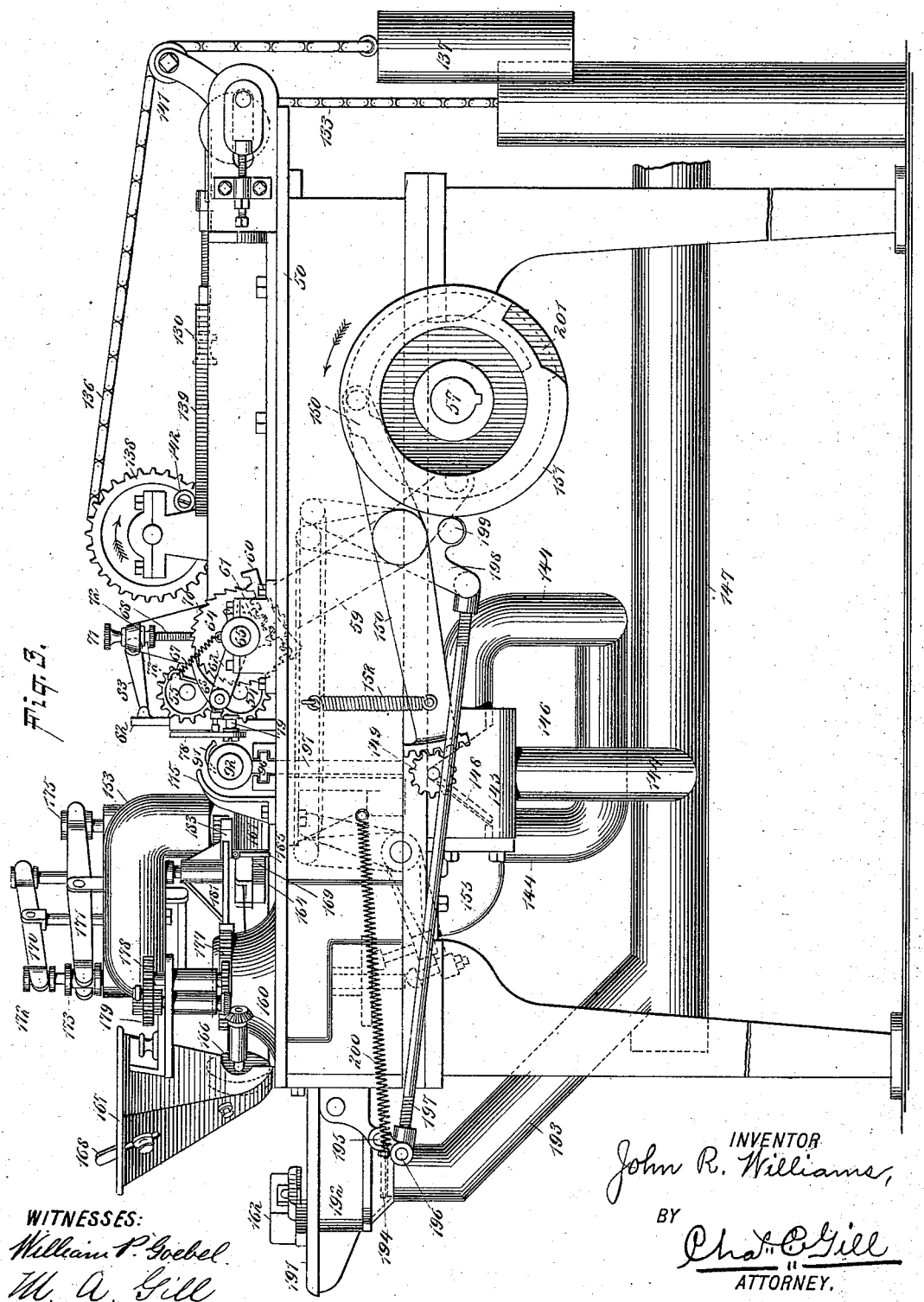
WITNESSES:
William P. Goebel
M. A. Gill
INVENTOR
John R. Williams,
BY
Chas. C. Gill
ATTORNEY.

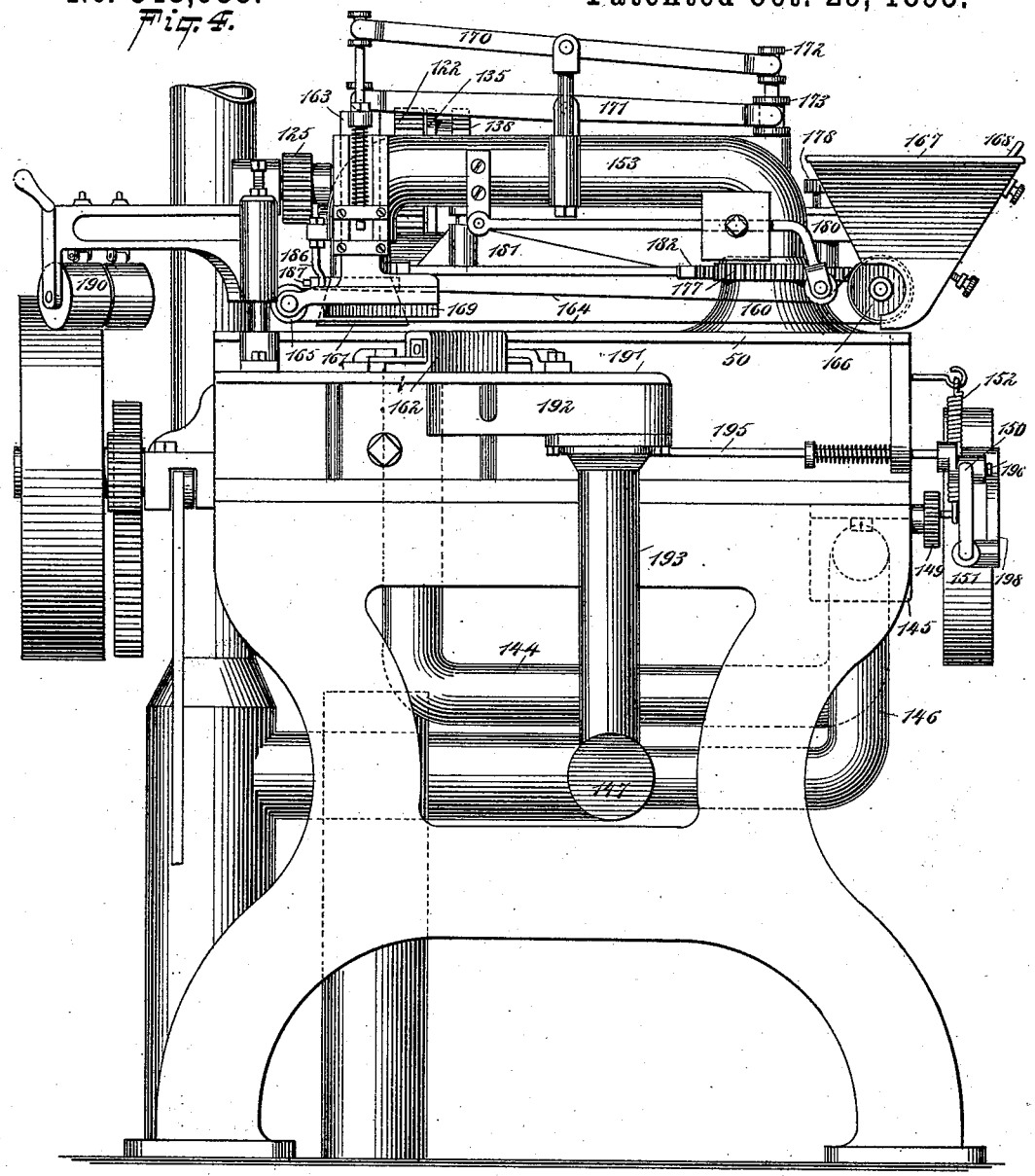

(No Model.) 15 Sheets—Sheet 5.
J. R. WILLIAMS.
MACHINE FOR MAKING CIGARETTES.
No. 548,688. Patented Oct. 29, 1895.
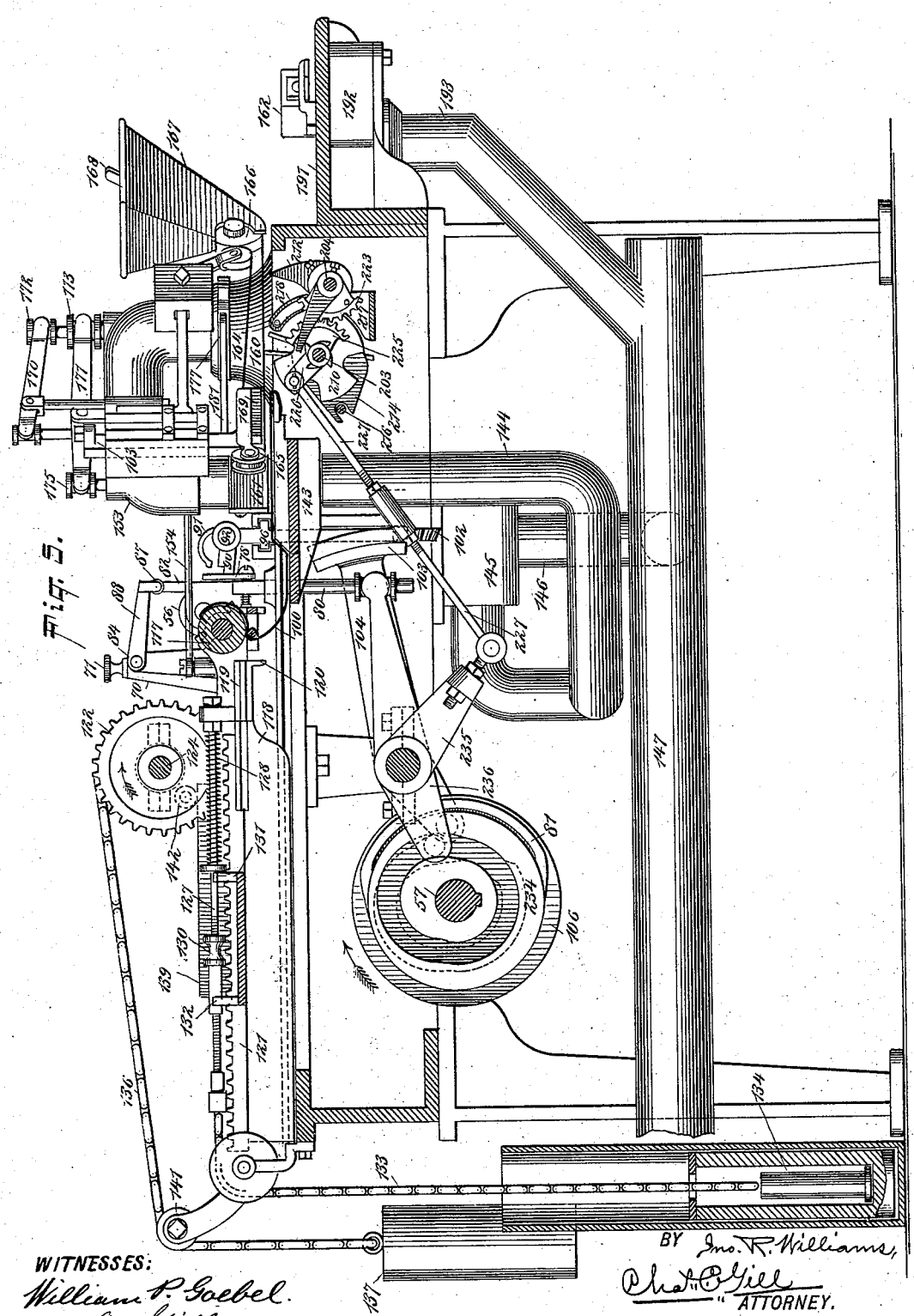
WITNESSES:
William P. Goebel.
M. A. Gill
BY Jno. R. Williams,
Chas. O. Gill
ATTORNEY.

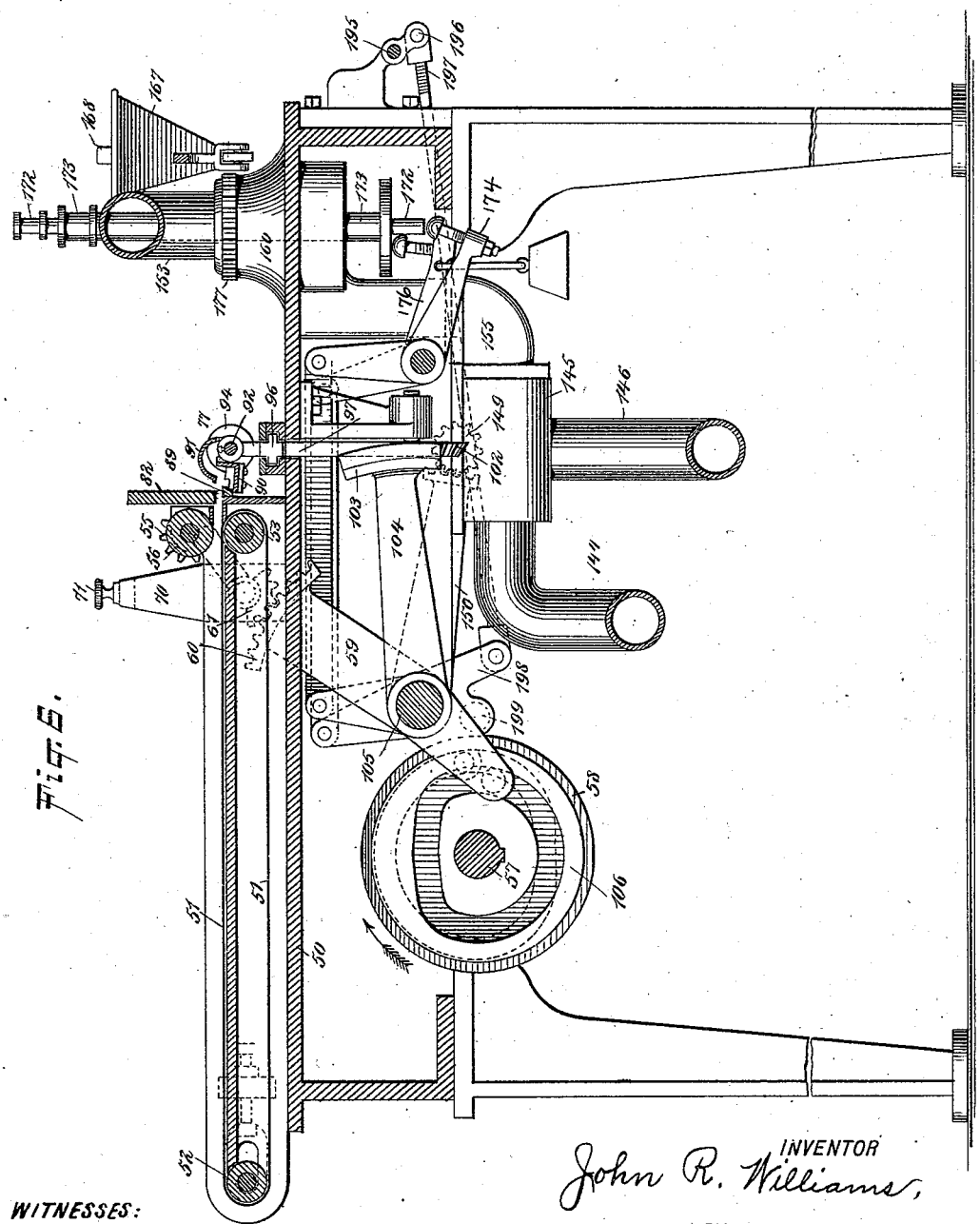

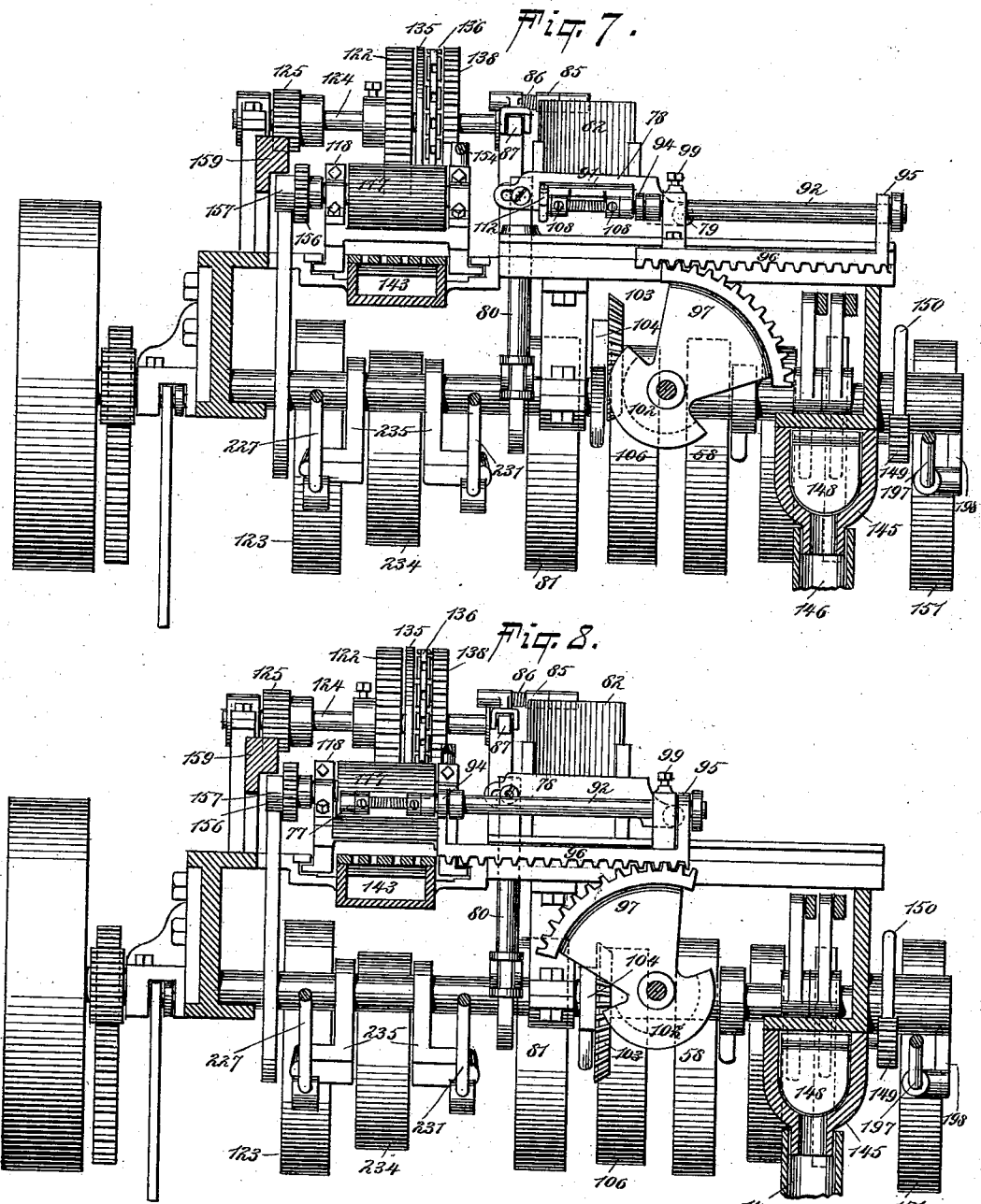

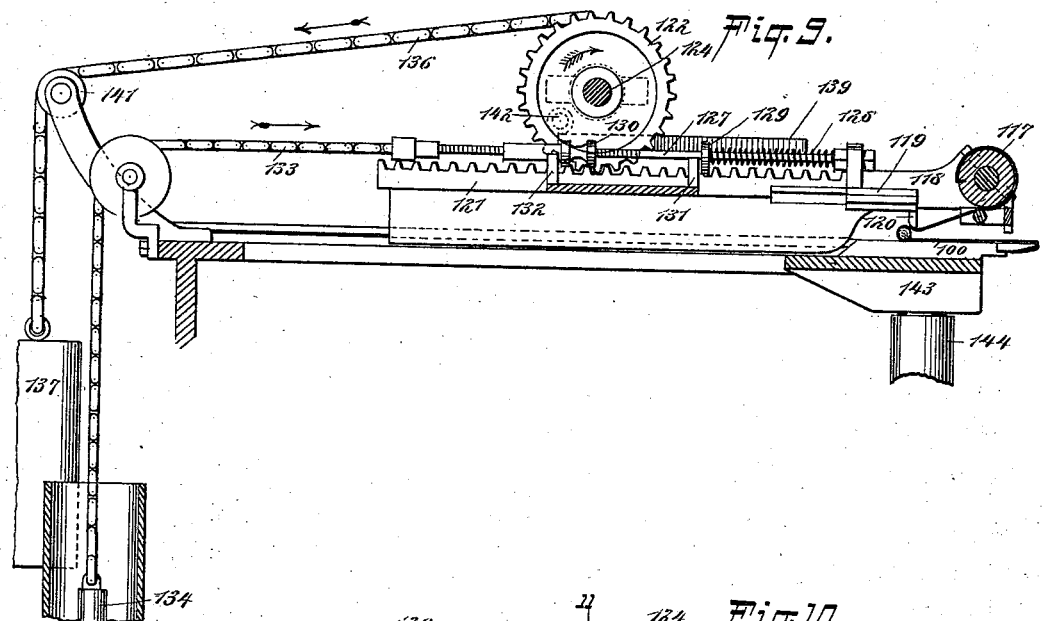
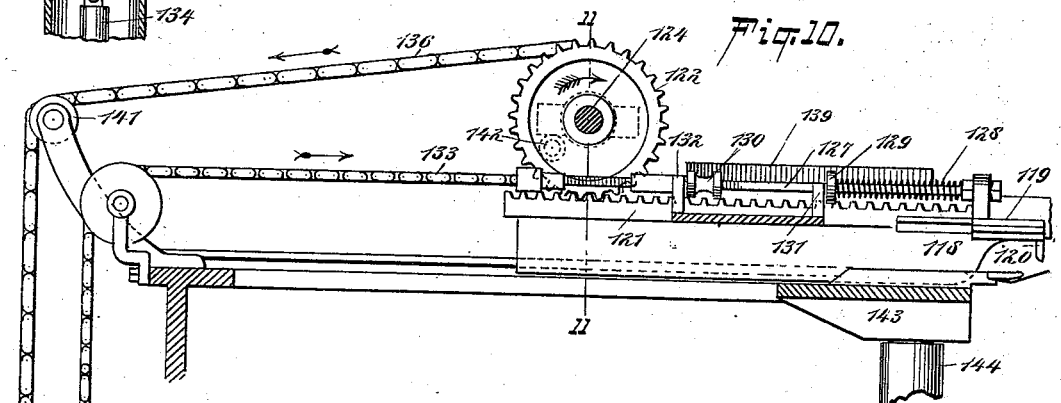
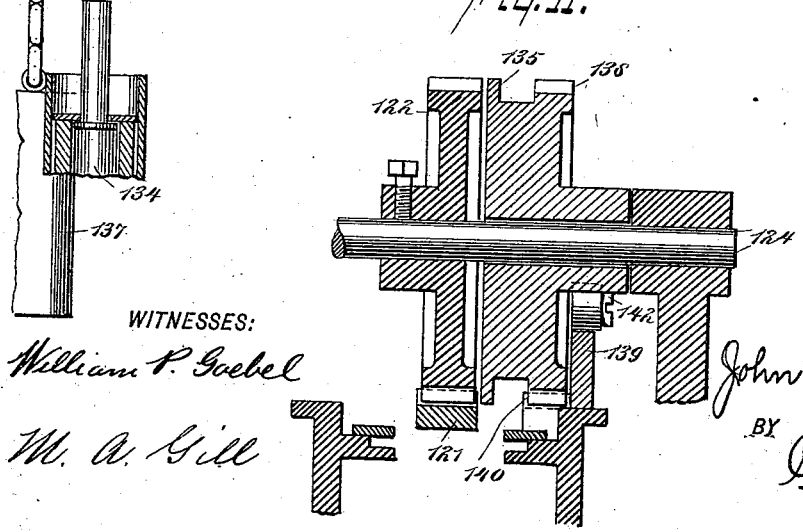

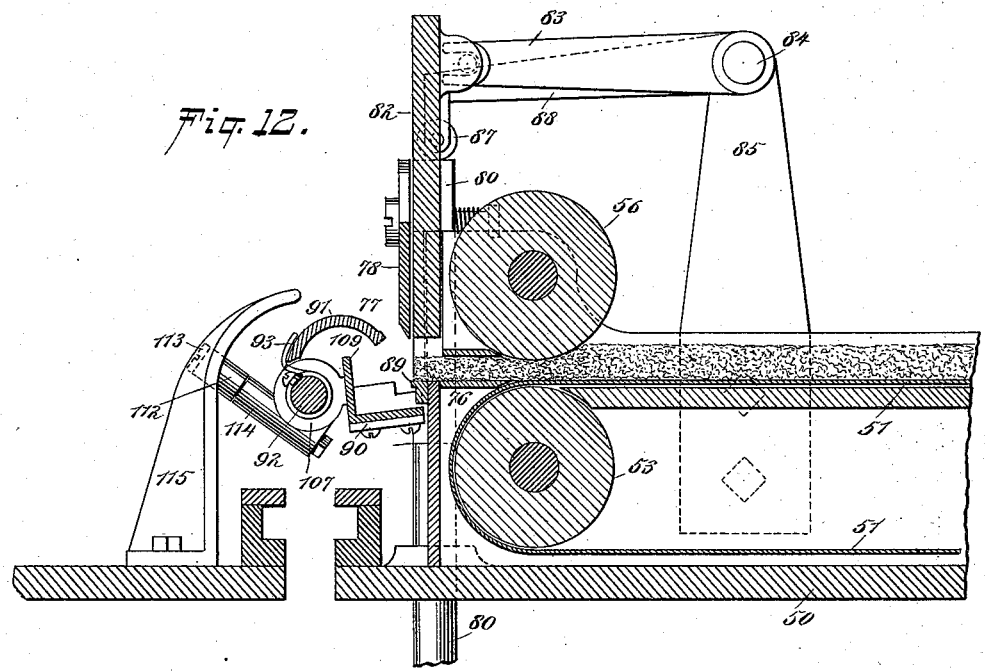

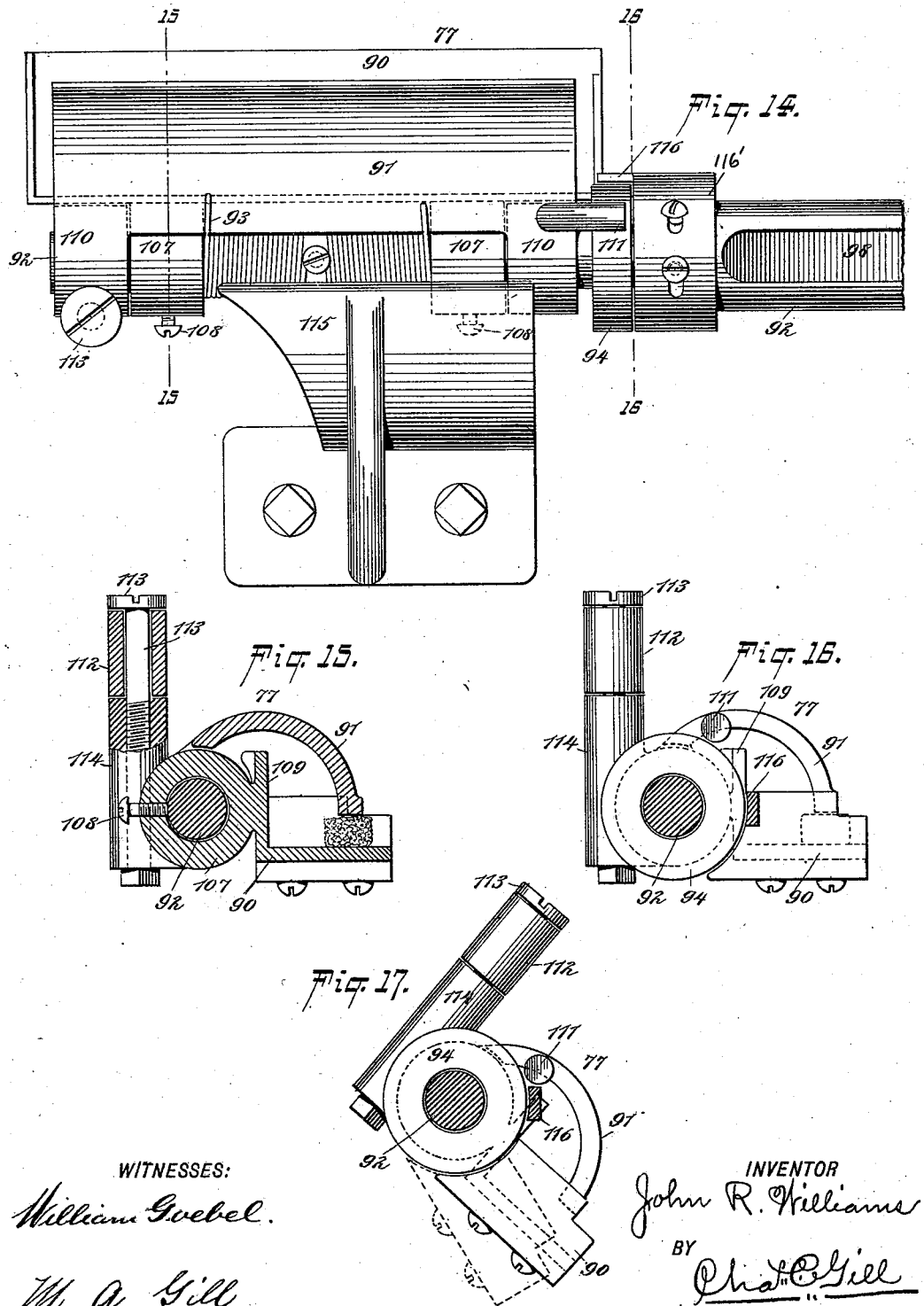

(No Model.)  15 Sheets—Sheet 11.
J. R. WILLIAMS.
MACHINE FOR MAKING CIGARETTES.
No. 548,688.  Patented Oct. 29, 1895.
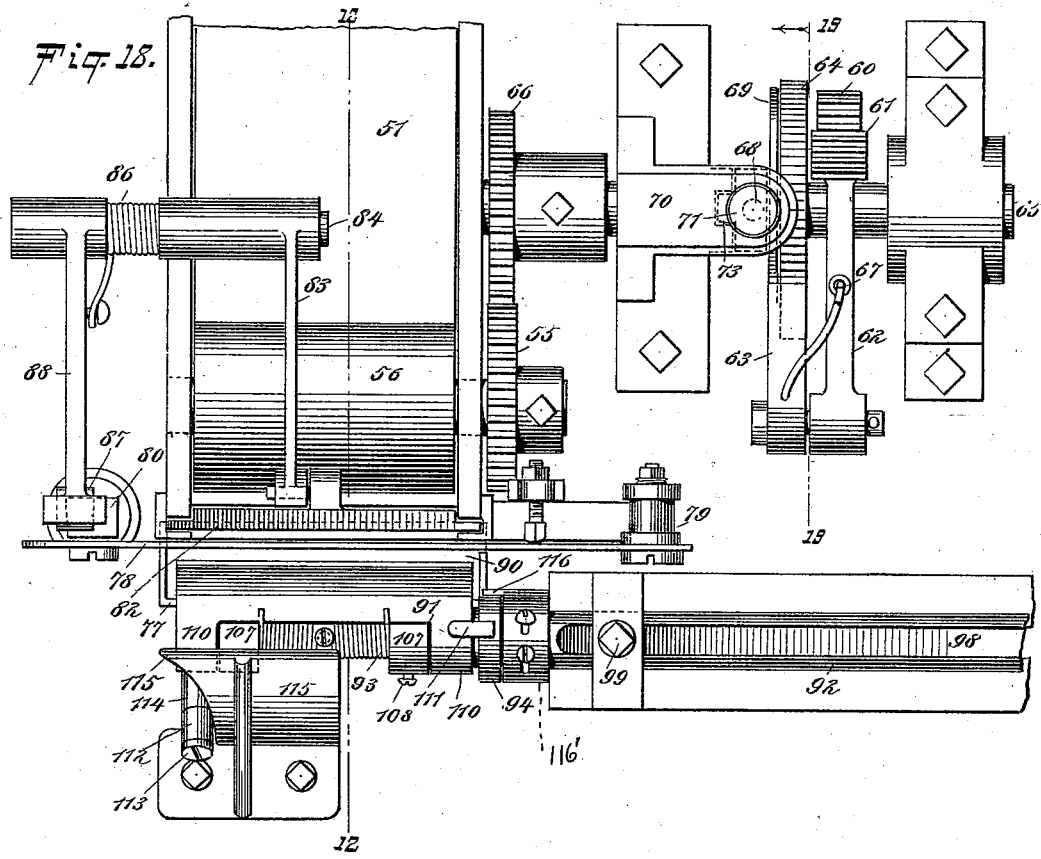
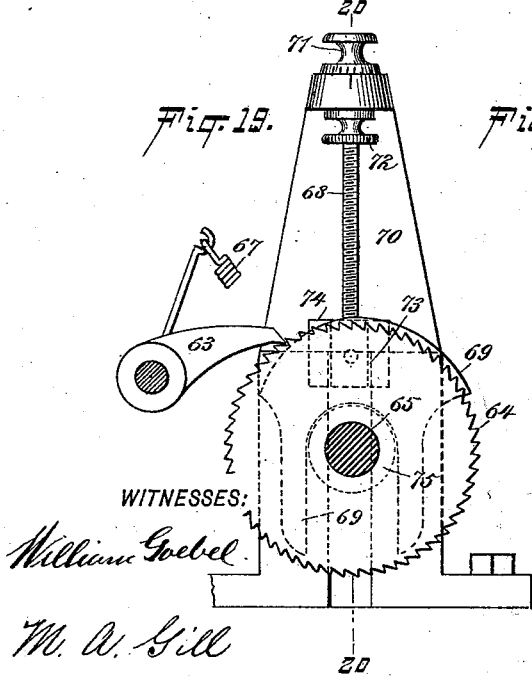
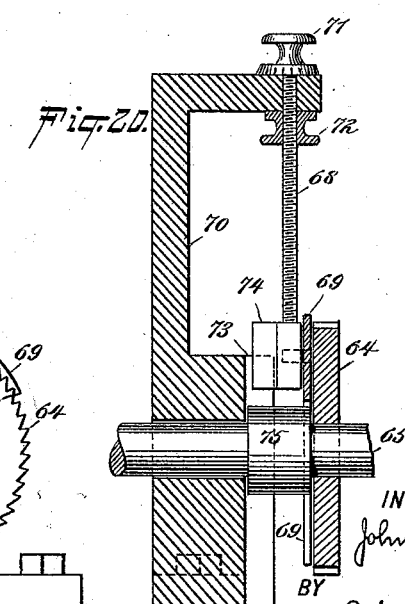
WITNESSES:
William Goebel
M. A. Gill
INVENTOR
John R. Williams,
BY
Chas. C. Gill
ATTORNEY.

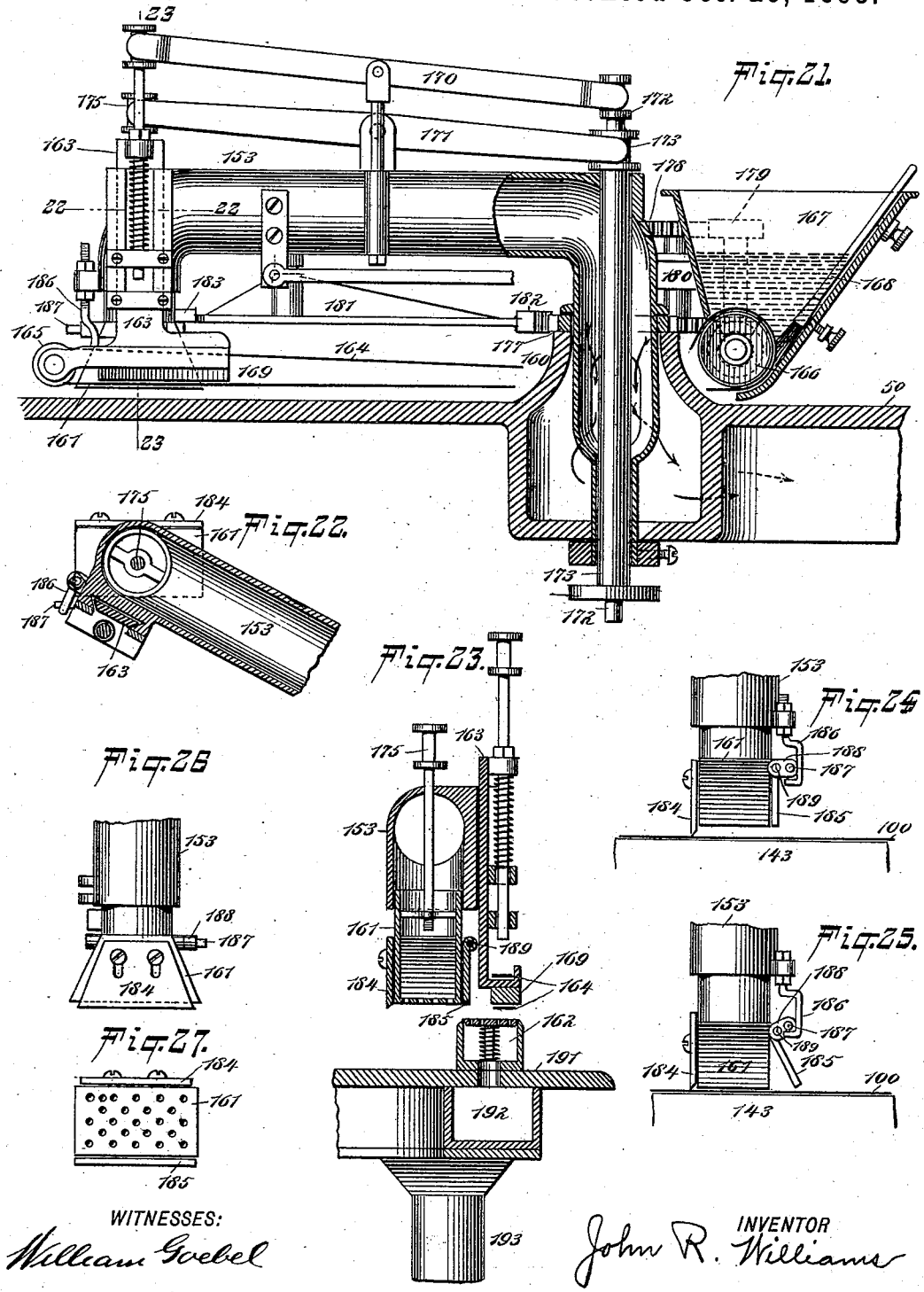

(No Model.) 15 Sheets—Sheet 13.
J. R. WILLIAMS.
MACHINE FOR MAKING CIGARETTES.

No. 548,688. Patented Oct. 29, 1895.

WITNESSES:
William Goebel.
M. A. Gill

INVENTOR
John R. Williams,
BY Chas. C. Gill
ATTORNEY.

(No Model.)
15 Sheets—Sheet 14.
J. R. WILLIAMS.
MACHINE FOR MAKING CIGARETTES.
No. 548,688.   Patented Oct. 29, 1895.
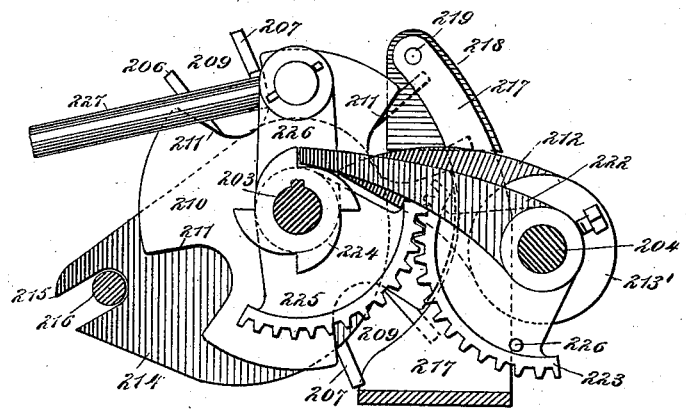
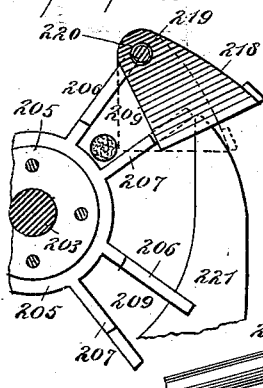
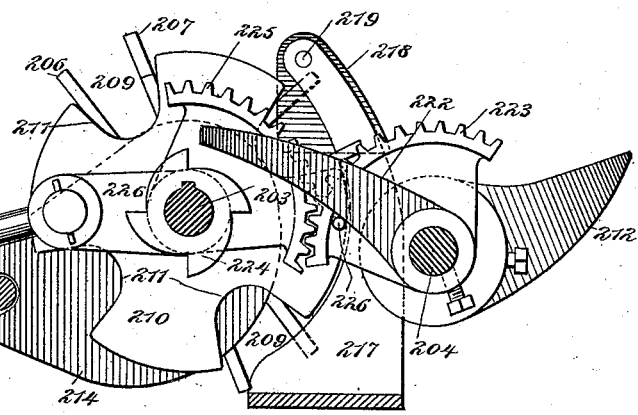
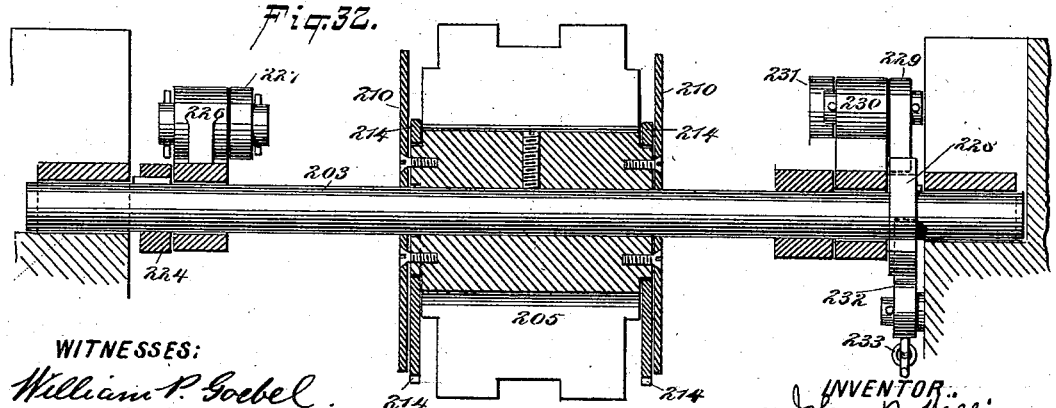
WITNESSES:
William P. Goebel
M. A. Gill
INVENTOR
BY John R. Williams
Chas. C. Gill
ATTORNEY.

(No Model.) 15 Sheets—Sheet 15.
J. R. WILLIAMS.
MACHINE FOR MAKING CIGARETTES.
No. 548,688. Patented Oct. 29, 1895.
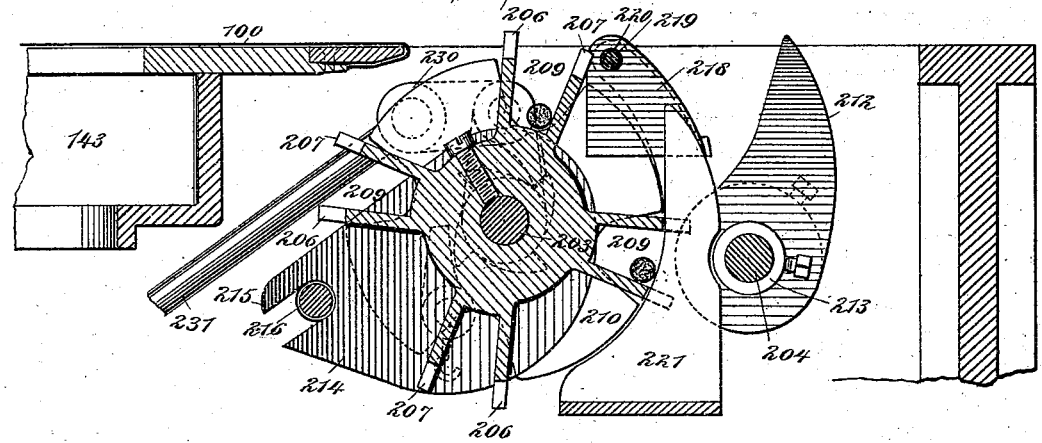
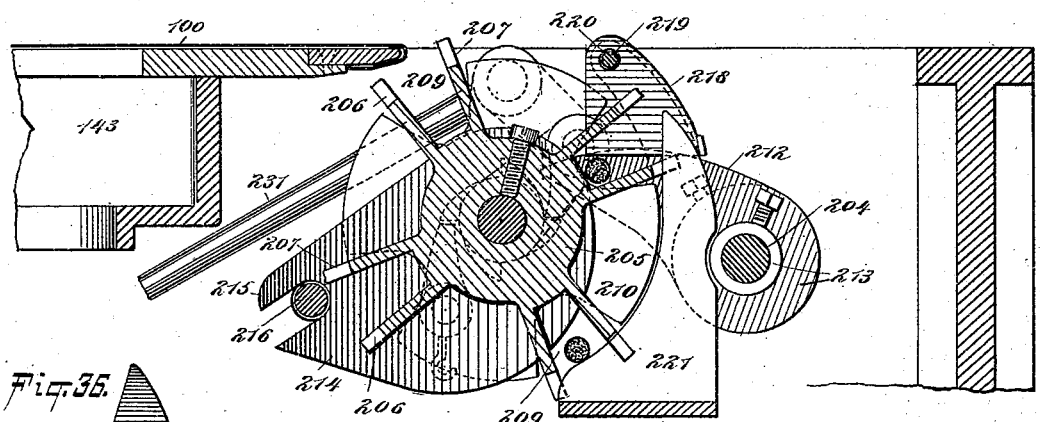
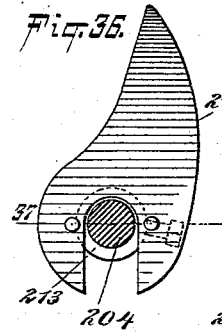
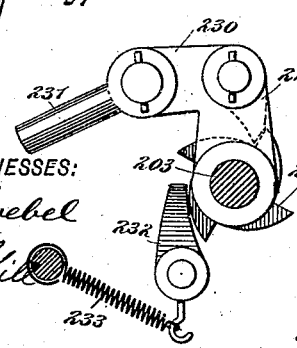
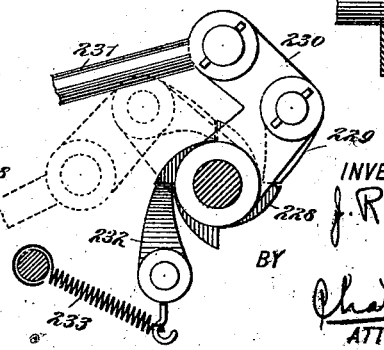
WITNESSES:
William Goebel
M. A. Gill
INVENTOR
J. R. Williams,
BY
Chas. C. Gill
ATTORNEY.

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y.

MACHINE FOR MAKING CIGARETTES.

SPECIFICATION forming part of Letters Patent No. 548,688, dated October 29, 1895.

Application filed May 16, 1895. Serial No. 549,502. (No model.)

*To all whom it may concern:*

Be it known that I, JOHN R. WILLIAMS, a citizen of the United States, residing at East Orange, in the county of Essex and State of New Jersey, have invented certain new and useful Improvements in Machines for Making Cigarettes, of which the following is a full, clear, and exact description.

The invention relates to improvements in machines for making cigarettes; and it consists in the novel features and combinations of parts, with certain details of construction, hereinafter fully described, and particularly pointed out in the claims.

The machine embodying the invention made the subject of this application embraces automatic mechanism for feeding the filler-tobacco in bulk, severing predetermined charges of the same, and delivering said charges to a traveling shuttle which conveys the same to the rolling-apron; also, mechanism for cutting the wrappers for the cigarettes, applying paste to the edge thereof, and conveying the same from the cutting mechanism to the rolling-table, the wrappers being held by air-suction in an even flat condition while being cut and pasted and while being carried from the cutting mechanism to the rolling-apron, which also is in connection with air-suction apparatus, whereby the wrapper is received in its distended flat condition and so held while being rolled upon the filler-tobacco for forming the cigarettes, and also novel mechanism for rolling the cigarettes and trimming the ends thereof while in the loop of the rolling-apron.

The construction and operation of the various parts of the machine will be specifically described in their order hereinafter, from which description and the accompanying drawings the invention will be more fully understood.

The machine which is the subject hereof is illustrated in the operation of rolling all-tobacco cigarettes; but I do not confine the invention in every instance to the use of a tobacco wrapper or binder, nor to the manufacture of cigarettes of any special length or diameter; nor is the invention confined to rolling what are technically known in law and commerce as "cigarettes," since the filler and wrapper or binder may be of larger proportions than those required for the usual cigarette, and under such conditions the product will be ordinarily termed "cigars" or bear other trade designations.

In the drawings are shown various cams and connecting-arms for imparting movement from the main driving-shaft to the mechanism constituting the essential parts of the machine; but the invention is not confined to these special cams and arms, and they may be varied within the skill of the intelligent mechanic.

The invention made the subject of this application embodies certain improvements hereinafter specifically pointed out on the machine described and claimed in my pending application for Letters Patent for improvements in machines for making cigarettes, filed November 19, 1894, Serial No. 529,282.

Figure 29:
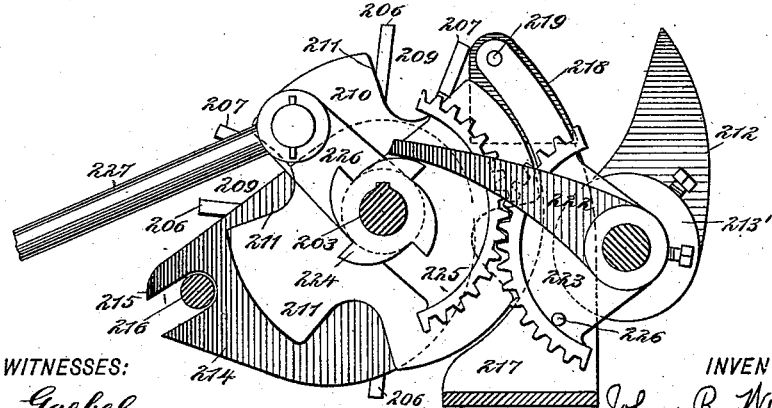

Referring to the accompanying drawings, Figure 1 is a top view of a machine constructed in accordance with and embodying the invention, the wrapper-carrier being shown in its rear position to deliver a wrapper upon the perforated rolling-apron and the shuttle which conveys the separate charges of tobacco to said apron being shown in line with the intermittently-moving feed-belt, upon which the filler-tobacco is placed by hand and which feeds the same inward toward said shuttle. Fig. 2 is a side elevation of the same, looking at the left-hand side of the machine. Fig. 3 is a like view of same, looking at the right-hand side of the machine. Fig. 4 is a front elevation of the same. Fig. 5 is a vertical longitudinal section of same on the dotted line 5 5 of Fig. 1. Fig. 6 is a like view of same on the dotted line 6 6 of Fig. 1. Fig. 7 is a vertical transverse section of same on the dotted line 7 7 of Fig. 1 and showing the transversely-reciprocating shuttle in line with the feed-belt. Fig. 8 is a like section of same on the same dotted line 7 7 of Fig. 1, but showing the said shuttle in position to deliver its charge of tobacco to the rolling mechanism. Fig. 9 is a detached vertical longitudinal section of same on the dotted line 9 9 of Fig. 1. Fig. 10 is a like section of same on the same dotted line, but showing the parts in the relative positions they assume during the latter part of the forward movement of the rolling mechanism. Fig. 11 is a central vertical section, on an enlarged scale, taken transversely through a part of the machine on the dotted line 11 11 of Fig. 10. Fig. 12 is a central vertical section, on an enlarged scale, taken longitudinally through a part of the machine on the dotted line 12 12 of Fig. 18. Fig. 13 is a like section of same on the same line, but showing the parts in the position they assume when the knife has descended to sever a charge of filler-tobacco. Fig. 14 is an enlarged detached top view of the shuttle which conveys the severed charges of tobacco from the feed mechanism to the rolling mechanism. Fig. 15 is a vertical section of same on the dotted line 15 15 of Fig. 14. Fig. 16 is a vertical section of same on the dotted line 16 16 of Fig. 14. Fig. 17 is a like section of same, the shuttle being shown by solid lines as having rotated a definite distance without the relation to each other of the lower and upper plates thereof having been disturbed, and the dotted lines showing the lower plate as having left the upper plate to release the severed charge of tobacco (shown in Fig. 15) and permit its escape to the rolling-apron. Fig. 18 is a top view of that portion of the machine comprising the shuttle and its connecting parts, the knife for severing the charges of filler-tobacco, a portion of the feed-belt, and the mechanism for imparting motion to said belt. Fig. 19 is a vertical longitudinal section of same on the dotted line 19 19 of Fig. 18. Fig. 20 is a vertical transverse section of same on the dotted line 20 20 of Fig. 19. Fig. 21 is a side elevation, partly in section, of the oscillating pneumatic wrapper-carrier and its connections, the paste-receptacle connected to said carrier and the bed-plate of the machine being shown in section. Fig. 22 is a detached horizontal section of same on the dotted line 22 22 of Fig. 21. Fig. 23 is a vertical section of same on the dotted line 23 23 of Fig. 21. Fig. 24 is a detached end view of the lower end of the wrapper-carrier and the nozzle carried thereby, this figure being presented particularly to illustrate the protecting and downwardly-projecting plate on one side of the nozzle and the hinged plate on the opposite side thereof. Fig. 25 is a like view of same, showing the nozzle depressed upon the rolling mechanism, the protecting-plate moved upward by its contact with said mechanism, and the hinged plate turned outward from the side of said nozzle. Fig. 26 is a side elevation of same. Fig. 27 is a bottom view of same. Fig. 28 is an enlarged detached top view of the mechanism for receiving the cigarettes from the rolling mechanism and trimming the ends thereof. Fig. 29 is a sectional view of same on the dotted line 29 29 of Fig. 28. Fig. 30 is a like section of same on the same dotted line, but showing the cigarette-carrying frame as having completed a one-quarter revolution and the knives as having descended to trim the ends of a cigarette. Fig. 31 is a like section of same on the same dotted line, but showing the knives as having returned to their extreme forward position and a stud on the knife-operating mechanism as having ascended to elevate the pawl which checked the cigarette-carrying frame at the end of its one-quarter revolution. Fig. 32 is a sectional view of same on the dotted line 32 32 of Fig. 28. Fig. 33 is a detail view of a part of same and showing by dotted and full lines, respectively, the two positions of certain holding-plates which are moved outward, as shown by full lines, by the front wings on the revoluble cigarette-carrying frame and then permitted to return to their normal position (shown by dotted lines) to prevent upward movement in the cigarette subjected to the action of the trimming-knives. Fig. 34 is a vertical longitudinal section of same on the dotted line 34 34 of Fig. 28. Fig. 35 is a like section of same on the same dotted line, but showing the position of the parts when a cigarette is trimmed. Fig. 36 is a detail view showing one method of securing the trimming-knives on their shaft. Fig. 37 is a section of same on the dotted line 37 37 of Fig. 36. Fig. 38 is a sectional view on the dotted line 38 38 of Fig. 28 and showing the pawl-and-ratchet mechanism for rotating the shaft upon which the cigarette-carrying frame is mounted. Fig. 39 is a like view of same on the same dotted line, but showing the parts in a different position.

In the drawings, 50 denotes the main supporting-table or bed-plate of the machine, suitably mounted upon legs and properly sustaining the operative mechanism constituting the essential features of the invention.

The filler-tobacco used for the manufacture of the cigarettes is fed inward upon an endless traveling belt 51 of well-known form and function, the tobacco being spread upon the belt by hand and being thereby fed intermittently inward to the shuttle, by which the charges of the filler-tobacco for the individual cigarettes are conveyed to the rolling mechanism. The belt 51 is mounted upon rollers 52 and 53, the latter having upon the right-hand end of its shaft a gear-wheel 54, (see Fig. 3,) which is in engagement with the similar gear-wheel 55, mounted upon the right-hand end of the shaft for the upper feed-roller 56. The rollers 52, 53, and 56 have heretofore been employed in this art. The belt 51 receives its motion from the main driving-shaft 57 through the medium of the cam 58 thereon, acting through the pivoted lever 59 (shown by dotted lines in Fig. 3) and having upon its upper end the segment 60, which is in engagement with the segment 61, formed upon the lever 62, carrying at its front end the pawl 63, engaging the ratchet 64, the latter being rigidly mounted upon the shaft 65, carrying the gear-wheel 66, Fig. 1, which is in constant engagement with the gear-wheel 54, Fig. 3, mounted upon the shaft of the roller 53.

The rocking motion imparted to the lever 59 by the cam 58 causes, through the segments 60 and 61, an oscillating motion in the lever 62, carrying the pawl 63, the movement of the said pawl 63 toward the rear of the machine operating through the ratchet 64 to turn the shaft 65 and through it the pinion-wheel 66, by which the motion of said shaft 65 is imparted through the gear-wheels 54 and 55 to the rollers 53 and 56. The turning of the roller 53 imparts motion to the traveling feed-belt 51. The pawl 63 has connected with it the spring 67, as shown in Fig. 3. The lever 62 is simply fulcrumed upon the shaft 65, while the ratchet 64 and gear-wheel 66 are rigidly secured upon said shaft. The mechanism just described for imparting motion to the shaft 65 and through it and the connected gear-wheels to the belt 51 is not sought to be claimed in this application.

The novel features of the feed mechanism, so far as the present application is concerned, consist in the mechanism whereby the extent of throw of the pawl 63, and consequently the extent of movement permitted in the belt 51, may be regulated, and this mechanism consists of the regulating-screw 68 and the plate 69 connected therewith, as illustrated more clearly in Figs. 3, 18, 19, and 20. The screw 68 is mounted in the vertical frame 70 and is provided upon its upper end with the head 71, the latter being above the upper horizontal portion of said frame 70, while below the same the screw 68 is furnished with the jam-nut 72. In the lower vertical face of the frame 70 is formed a guide 73, as shown in Figs. 18, 19, and 20, to receive and direct the movement of the follower 74, mounted on the lower end of the screw 68, and to which the plate 69 is directly connected. The plate 69 lies close against the inner face of the ratchet 64 and straddles the collar 75, provided upon the shaft 65 intermediate the said ratchet and frame 70, the collar 75 serving as a guide for the said plate 69.

The upper edge of the plate 69 is curved and eccentric to the circular outline of the ratchet 64, as indicated in Fig. 19, and, as illustrated in Fig. 18, the engaging point of the pawl 63 is sufficiently wide to extend over both the ratchet 64 and the plate 69.

When the plate 69 has its upper edge entirely below the upper edge of the ratchet 64, the pawl 63, being unaffected by said plate, will have a definite throw governed by the shape of the cam 58 and the extent of the movement imparted thereby to the lever 59 and through said lever to the lever 62, carrying the said pawl 63. In order, however, to adjust the extent of the throw of the pawl 63, the plate 69 and the screw 68 have been provided, and when, by means of the screw 68, the plate 69 is elevated so that a portion of its surface is above the ratchet 64 the pawl 63 can only remain in engagement with the ratchet 64 during the time it is traveling from its normal or initial position to the point at which its engaging edge will pass upon the upper edge of the plate 69 and be thereby elevated above the ratchet 64. By the adjustment of the screw 68 the relation of the plate 69 to the ratchet 64 may be regulated at will, and, hence the length of travel the pawl 63 shall have before reaching the plate 69, and, being disengaged thereby from the ratchet 64, is wholly within the control of the operator. When it is desired, for instance, to decrease the extent of the intermittent movements of the belt 51 for the purpose of decreasing the size of the charges of filler-tobacco for the individual cigarettes, the plate 69 will be elevated by means of the screw 68 for the purpose of shortening the throw of the pawl 63 against the ratchet 64, and when it is desired to increase the extent of the intermittent movements of the belt 51 for the purpose of increasing the size of the charges of filler-tobacco for the individual cigarettes the plate 69 will be lowered, so as to permit a longer throw of the pawl 63 while in engagement with the ratchet 64.

The length of time the pawl 63 is permitted to remain in engagement with the ratchet 64 during the operation of the machine governs the extent of the intermittent movements of the belt 51, and consequently regulates the quantity of filler-tobacco to be delivered to the shuttle hereinafter described for the cigarettes. It is to be observed that the movements of the screw 68 and plate 69, while regulating the movements of the belt 51, have no effect upon the levers 59 and 62 or cam 58, and hence that the feed of the filler-tobacco may be regulated at will without interfering with the general mechanism of the machine.

If desired, upon the edge of the head 71 and adjacent surface of the frame 70 may be provided indicating-marks, as shown in Fig. 19, to guide the operator in adjusting the plate 69 in accordance with the size of the cigarettes to be produced. I recommend the use of the indicating-marks just referred to, though the invention is not limited to their employment.

At the front end of the feed-belt 51 is provided the throat 76, through which the filler-tobacco must pass to the shuttle 77, as illustrated more clearly in Figs. 12 and 13. The throat 76 is illustrated in my above-mentioned application for Letters Patent, filed November 19, 1894, and is not sought to be specifically claimed herein. At the front end of the throat 76 is provided the knife 78, by which the charges of filler-tobacco are severed preparatory to their being conveyed to the rolling mechanism hereinafter described. The knife 78 is secured at one end upon the stud 79 and at its other end upon the rod 80, as illustrated more clearly in Figs. 7 and 8. The knife 78 has imparted to it through the rod 80 an oscillating movement from the cam 81, secured upon the main driving-shaft 57, and said knife, with its rod 80 and cam 81, is substantially disclosed in my aforesaid pending application.

Arranged to co-operate with the knife 78, I have provided a plunger 82, (see Figs. 1, 12, 13, and 18,) which is suspended upon the arm 83, extending frontward from the transverse rock-shaft 84, mounted in the standard 85 and having a spring 86, (shown in Figs. 1 and 18,) which acts upon said shaft 84 and creates a downward tension upon the plunger 82. The plunger 82 is preserved in its upward position by the contact of the upper edge of the knife-rod 80 or any part carried thereby against the roller 87, carried by the arm 88, Fig. 18, rigidly mounted on said rock-shaft 84. When the knife 78 under the action of the cam 81 is moved to its upper position, (shown in Fig. 12,) the upper end of the knife-rod 80 will move against the roller 87 and elevate the front end of the arm 88, thereby rocking the shaft 84 and causing the arm 83 to elevate the plunger 82, as illustrated in Fig. 12, and when the knife 78 descends to sever a charge of filler-tobacco, as illustrated in Fig. 13, the spring 86 on the rock-shaft 84 will be relieved of the restraint of the said knife-rod 80 and will cause the said shaft 84 to rotate toward the front and, through the arm 83, to move the plunger 82 downward upon that portion of the filler-tobacco at the front of the delivery-throat 76. The purpose of the plunger 82 is not to pack or compress the filler-tobacco, but simply to hold the same with firmness while the knife 78 severs a definite charge of the tobacco for a cigarette, and said plunger in many instances may be entirely omitted from the machine. The knife 78 severs that portion of the filler-tobacco which by the intermittent movement of the feed-belt 51 is moved frontward beyond the vertical plane of the table 89, against whose outer edge, as illustrated in Fig. 13, the said knife 78 performs the cutting operation.

The charges of tobacco severed by the knife 78 are conveyed from the point at which they are severed to the rolling mechanism by means of the shuttle 77, which has a transverse reciprocating motion. The shuttle 77 is composed of the lower plate 90 and the upper plate or cover 91, (see Figs. 12 to 18, inclusive,) the former being rigidly secured upon the shaft 92, while the cover 91 is simply collared or hinged upon said shaft and is adapted to be closed toward the plate 90 by the tension of the spring 93, flexed against it, as illustrated more clearly in Figs. 12 to 14, inclusive.

The shaft 92 is substantially illustrated in my aforesaid pending application and is mounted in the bearings 94 and 95, (see Figs. 1, 7, and 8,) connected with the toothed rack 96, the latter being in engagement with the segment 97, by which the said rack has imparted to it from the driving-shaft 57 a reciprocating movement. The motion of the rack 96 is imparted to the shaft 92 and shuttle 77 as described in my aforesaid pending application, and the upper surface of the said shaft 92 at the right-hand side of the shuttle 77 is provided with the groove 98, receiving a stationary stud 99, which, as described in the said pending application, effects at the proper time a turning movement in the said shaft 92 and shuttle 77. When the shuttle 77 is in line with the feed-belt 51, its bottom plate 90 should be in a substantially horizontal position, as illustrated in Figs. 12 and 13; but when the shuttle 77 has traveled to the left and is directly over the rolling-apron 100 it should be turned to the position illustrated in Fig. 17 by dotted lines in order that the charge of tobacco carried thereby may be deposited upon the said apron, and hence at the right-hand end of the groove 98 in the shaft 92 is provided a spiral continuation 101, Fig. 1, in said groove in order that when the said shaft 92 has traveled to the left sufficiently the stud 99 will enter the spiral portion 101 of the said groove and force the said shaft 92 to have a sufficient turning motion to insure the proper discharge of the filler-tobacco from the shuttle 77. The stud 99, groove 98, and spiral continuation 101 of said groove are illustrated in the aforesaid pending application.

The segment 97, which effects the reciprocation of the rack 96, shaft 92, and shuttle 77, is provided with the auxiliary segment 102, Figs. 6, 7, and 8, which is in engagement with the segment 103, formed upon the front end of the lever 104, the latter being pivotally mounted upon the auxiliary or fulcrum shaft 105 and in engagement with the cam 106, carried by the main driving-shaft 57, as described in the said pending application. The shuttle 77, however, differs materially in construction from the shuttle embodied in said pending application, and hence forms a part of the invention sought to be protected hereby.

The lower plate 90 of the shuttle 77 carries the collars 107, which are attached to the shaft 92 by means of the screws 108, the said plate being thus adjustable on the said shaft and rigid therewith when adjusted. The lower plate 90 has a substantially horizontal main surface and is provided at its inner end with the vertical portion or back 109, as illustrated more clearly in Fig. 15. The cover 91 for the said shuttle 77 is preferably concavo-convex in cross-section and is provided with the collars 110, by which it is secured in a hinged manner to the said shaft 92. The cover 91 is provided with the stud 111, as shown in Figs. 14, 16, and 17, and is also provided with the wheel or roller 112, which is secured upon the arm or screw 113, whose lower end enters the stud 114, cast with the collar 110 of said cover 91.

It has been described above that the spring 93, wound upon the shaft 92, operates to close the cover 91 toward the lower plate 90; but when the shuttle is in line with the feed-belt 51 it is desirable that the said cover 91 be retained in its open position, as illustrated in Figs. 12 and 13, and to effect this result the cam 115 has been provided to engage the said roller 112 while the shuttle 77 is completing the latter part of its movement from the rolling-apron 100 to its position in line with the feed-belt 51. When the shuttle 77 is thus traveling toward the right to receive another charge of the filler-tobacco, the roller 112 will come into contact with the inclined edge of the cam 115, and thereby the latter will be enabled to force the screw 113 and stud 114 frontward and downward, the result being that the motion imparted to the said screw 113 and stud 114 will turn the collar 110 upon the shaft 92 and elevate the cover 91 to its open position, in which position the said cam 115 will retain the cover 91 during all the time the shuttle 77 remains stationary in line with the feed-belt 51. When the said shuttle 77 starts to the left to deposit its charge of filler-tobacco upon the apron 100, the roller 112 will gradually recede from the inclined edge of the cam 115, and hence the said cover under the action of the spring 93 will close upon the charge of filler-tobacco resting upon the plate 90 of said shuttle, as illustrated in Fig. 15.

The relation of the lower plate 90 of the shuttle 77 with the cover 91 thereof (shown in Fig. 15) will remain until the shuttle has reached the point above the rolling-apron at which the charge of filler-tobacco is to be deposited, and when this point is reached the shaft 92, as above described, will make its rotary motion, and in doing so will turn both the lower plate 90 and the cover 91 in unison a definite distance until the cover is arrested by the contact of its stud 111 with the rigid stop 116, as shown in Fig. 18, whereupon the continued motion of the shaft 92 will carry the bottom plate 90 of the shuttle downward to the position indicated by dotted lines in Fig. 17, thus separating the said bottom plate from the said cover and permitting the escape of the charge of filler-tobacco to the apron 100. After the tobacco has been discharged upon the apron 100 the shaft 92 will start to the right and during the first part of its movement the stud 99, acting upon the spiral portion of the groove 98, will restore the shuttle 77 to its horizontal position, during which the shaft 92 first restores the bottom plate 90 to the position illustrated by full lines in Fig. 17 and then continuing said plate 90 and the cover 91 return to their horizontal position, in which they move toward the right. Upon the shuttle 77 and shaft 92 reaching their position at the right-hand side of the machine, as illustrated in Fig. 1, the roller 112 will have been turned forward and downward by the inclined edge of the cam 115 for the purpose of elevating the top plate or cover 91 of the shuttle in order that the succeeding movement of the feed-belt 51 may move a definite quantity of the filler-tobacco beyond the vertical plane of the table 89 and upon the bottom plate 90 of said shuttle.

It is desirable that the lid or cover 91 when closed upon the filler-tobacco, as shown in Fig. 15, shall not compress the latter, but simply hold it sufficiently firm to insure its being carried to the rolling-apron 100, and since it may be desirable to vary the quantity of filler-tobacco for the cigarettes the bottom plate 90 will be adjusted upon the shaft 92 with respect to the size of the charges of tobacco the shuttle is to carry. For a small charge of tobacco the plate 90 would be adjusted upward toward the cover or upper plate 91 in order that the latter may reach and be enabled to hold the filler-tobacco, and when a larger quantity of tobacco is to be used for each individual charge the plate 90 will be adjusted downward upon the shaft 92 in order that the cover or upper plate 91 will be enabled to hold the same without unduly compressing it. The stop 116 is integral with the collar 116', adjustably held on the shaft 92 by screws, as shown in Fig. 14. By adjusting the collar 116' axially on the shaft 92 the point at which the plate 90 of the shuttle 77 will leave the cover or plate 91 may be regulated at will.

The shuttle 77 of the construction and characteristics above described is not illustrated in the aforesaid pending application and constitutes a part of the invention sought to be protected hereby.

The apron 100, which receives the charges of filler-tobacco from the shuttle 77 and effects the rolling of the cigarettes, is perforated, as shown in Fig. 1, at that part thereof upon which the leaf or wrapper is placed to receive the filler-tobacco, and said apron is the same as that illustrated in my aforesaid pending application. The front edge of the apron 100 is secured to the front edge of the rolling-table, and the rear end of the said apron is secured upon a roller 117, which is mounted upon the front end of the sliding carriage 118, this carriage also being illustrated in my aforesaid pending application. The carriage 118 slides in guideways of suitable form and carries the auxiliary carriage 119, to which is affixed the blade 120, Figs. 9 and 10, utilized for rolling the cigarettes, as fully explained in said pending application. In the said pending application the carriages corresponding with those numbered 118 and 119 herein move upon guide-rods, while in the present application the rods have been omitted and grooved guides, their equivalent, substituted in lieu thereof, the mode of operation, however, being the same.

Upon the carriage 118 is provided the rack 121, Figs. 1, 9, 10, and 11, which is engaged by the gear-wheel 122, the latter receiving its motion from the cam 123 on the main driving-shaft 57 and intermediate mechanism, comprising the shaft 124, pinion-wheel 125, and pivoted segment 126, Fig. 2, whose upper end engages said pinion and whose lower end is engaged by said cam 123 in the manner described with respect to the operation of said parts in the said pending application. The purpose of the gear-wheel 122 is to effect the reciprocating movement of the carriage 118 and roller 117 in a well-known manner.

Upon the carriage 119 is provided the rod 127, having the spring 128, the stop 129 for the spring, the stop-nut 130, adapted to travel between the rigid stops 131 and 132, and the chain 133 and weight 134, all these elements being identical with the mechanism shown in my aforesaid application for patent.

The novel features, so far as the present application is concerned, connected with the carriages 118 and 119, consist of the grooved wheel 135, chain 136, weight 137 on said chain, gear-wheel 138, tramway 139, and rack 140, all of which elements are illustrated in Fig. 1 and in detail in Figs. 9, 10, and 11. The wheel 135 is loose upon the transverse shaft 124 and is integral with the gear-wheel 138. The chain 136 is rigidly connected at one end to the said wheel 135 and at its other end to the weight 137 and passes over a small pulley-wheel 141. The gear-wheel 138 has upon one side the stud 142, which is adapted to slide along the tramway 139 and prevent at such time any rotation of the wheels 135 and 138.

During the reciprocating motion of the carriage 118 the stud 142 will slide on the tramway 139 and prevent the wheels 135 and 138 from rotating until the shaft 124 is in rear of the said tramway 139. During the forward travel of the carriage 118, carrying the roller 117, the tramway 139 will slide beneath the stud 142 until the rear end of the said tramway has passed to the front of said stud, whereupon the stud being no longer restrained by the tramway the teeth of the gear-wheel 138 will engage the rack 140 and be revolved thereby, the effect of this revolving of the wheels 135 and 138 being that the former will when turning toward the rear unwind from itself the chain 136 and allow the weight 137 to gradually descend. During the rearward motion of the carriage 118 and roller 117, the rack 140 during the first part of said motion being in contact with the wheel 138 will revolve the wheels 135 and 138 toward the front of the machine and wind up the chain 136 and thereby elevate the weight 137, and this operation of elevating the weight 137 continues until the rack 140 has left the gear-wheel 138 and the stud 142 on said gear-wheel has come into contact with the rear end of the tramway 139, after which the continued motion of the carriage 118 will have no effect upon the gear-wheel 138 or the weight 137, since the said tramway will simply slide beneath the stud 142, and through said stud restrain the gear-wheel from rotating. The force of the weight 137, suspended upon the chain 136, will retain the stud 142 against the upper surface of the tramway 139, the latter acting as a continued stop for said stud to restrain the rotation of the gear-wheel 138.

In the operation of rolling a cigarette, it being assumed that the leaf and the charge of filler-tobacco have been deposited upon the apron 100, the carriage 118 and the auxiliary carriage 119 are moved forward in unison until the blade 120, due to the restraint exerted by the weight 134 thereon, has drawn the loop in the apron down to its proper size and the nut 130 has come into contact with the rigid stop 132, as described in the said pending application for Letters Patent, after which the force of the weight 134 is exerted upon said stop 132, the said weight 134 being gradually elevated as the carriage 118 travels forward to roll the cigarette in the customary manner.

It is to counterbalance the weight 134 that the weight 137 has been provided, and hence the relation of the parts is such that when the weight 134 is in its lower position and exerting no force upon the carriage 119 or the shaft 124, the weight 137 will be in its upper position and held in check by the contact of the stud 142 with the tramway 139, and that when the weight 134 is being elevated and the force of its resistance is felt by the shaft 124 the gear-wheel 138 will be freed from the tramway 139 and engage the rack 141, at which time the downward pressure of the weight 137, acting through the gear-wheel 138 and rack 140, will operate to facilitate the forward motion of the carriage 118, thus relieving the strain exerted by the weight 134 upon the shaft 124. The weight 134 exerts considerable strain upon the carriage 118 and through it upon the shaft 124 and the gearing connected therewith, the said weight weighing about twenty pounds, and in my experience the force of this weight tends to impair the operation of the elements connected with the shaft 124 as well as to cause a rapid wear thereof, and to obviate these difficulties the weight 137 with its connections has been provided. The force of the weight 137, acting through the gear-wheel 138 and rack 140, operates to move the carriage 118 forward after the stud 142 has left the tramway 139, and, as above described, this occurs at the time the nut 130 on the rod 127 has reached the rigid stop 132 and the latter starts to lift the weight 134. Hence the weight 137, being about twenty pounds, counterbalances the weight 134 and so facilitates the action of the carriage 118 that all strain is removed from the shaft 124 and its connections.

The perforated portion of the apron 100 is, as above described, above a perforated portion of the supporting-bed for said apron, and this perforated portion of the bed is, as illustrated in Figs. 7 and 8, directly above the air-chamber 143, the latter by a pipe 144, Fig. 2, air-box 145, and pipe 146 being connected with the main air-pipe 147, leading to a vacuum chamber, (not shown,) as described in my aforesaid pending application for Letters Patent. Within the air-box 145 is provided the valve 148, (shown by dotted lines in Fig.

3,) the stem of said valve being provided with the pinion-wheel 149 in engagement with the rack at the front end of the pivoted lever 150, which is operated from the main driving-shaft 57 through the medium of the cam 151. The end of the lever 150 is kept against the cam-surface, whose form guides the said lever by means of the coiled spring 152. (Shown in Fig. 3.) The cam 151, lever 150, spring 152, pinion-wheel 149, valve 148, and air-box 145 are shown in my aforesaid pending application and will not require a more specific description herein.

The valve 148 operates to cut off the air-suction from the oscillating wrapper-carrier 153 at the moment the said apron 100 is to receive the wrapper therefrom in a well-known manner, the one motion of the valve 148 cutting the air off from the carrier 153 and turning it upon the apron 100 or cutting it off from the apron 100 and turning it upon the carrier 153. The carrier 153 is connected by a rod 154 with the carriage 118, and hence the said carrier has a movement imparted to it from the said carriage. The pipe 144 leads from the chamber 145 to the air-box 143, connected with the perforated rolling-table and belt, as shown more clearly in Fig. 2, while a pipe 155 leads from the valve-chamber 145 to the base of the oscillating wrapper-carrier 153, as illustrated more clearly in Fig. 3. When the valve 148 is in the position in which it is shown by dotted lines in Fig. 3, the air-suction will be downward through the perforated rolling-apron 100, air-box 143, pipe 144, chamber 145, and pipe 146 to the main exhaust-pipe 147, and when the valve 148 is turned to the right to close the pipe 144 the suction will be cut off from the rolling-apron 100 and the force of the air will then be exerted downward through the oscillating wrapper-carrier 153, pipe 155, chamber 145, and pipe 146 to the main exhaust-pipe 147. These lines of piping for the air and their connection with the perforated rolling-apron 100 and the oscillating wrapper-carrier 153 are fully explained in my aforesaid application for Letters Patent and will be understood without a more detailed description here.

The shaft of the roller 117 has upon its left-hand end the gear-wheel 156 and cam-wheel 157, (the latter shown by dotted lines in Fig. 1,) and this gear-wheel 156 is adapted to engage the inverted rack 158 (shown by dotted lines in Fig. 2) for the purpose of causing the roller 117 at the latter part of its movement to the front to rotate and wind upon itself the apron 100, and during the first part of its return movement toward the rolling-table to unwind said apron, while during the first part of the forward movement of the said roller the cam-wheel 157 is below the track or tramway 159 and prevents the roller 117 from rotating, this causing it to have a partial forward motion without rotation. During the latter part of the movement of the roller 117 toward the rear the cam-wheel 157, after the gear-wheel 156 has left the rack 158, will engage the track or tramway 159 and prevent the roller 117 from rotating. The gear-wheel 156, cam-wheel 157, inverted rack 158, and track or tramway 159 are also shown in my aforesaid pending application and are not sought to be independently claimed herein.

The oscillating wrapper-carrier 153 is pivotally mounted in the bearing 160 and carries at its outer end the nozzle 161, which has a perforated lower surface, as illustrated in Fig. 27, and is adapted to have a vertical movement within the lower vertical outer end of the said carrier 153. The wrapper-carrier 153, having at its outer end the reciprocating nozzle 161, and the means for mounting said carrier so as to permit of its having its oscillating movement are more fully illustrated in Figs. 21 to 27, inclusive, and are identical with the like elements shown and described in my aforesaid application for patent. The purpose of the carrier is mainly to pick up the cut leaf from the cutting-die 162 and convey it to the rolling-apron 100. While the carrier is intermediate the ends of its movement the nozzle 161 will be in its upper position, (shown in Fig. 23,) and when said nozzle is over the die 162 the said nozzle will be depressed upon said die in order, by means of the air-suction, to lift the wrapper therefrom. After the nozzle 161 has taken the cut wrapper from the die 162 it will be elevated, and while in its elevated position moved to a point directly over the perforations in the rolling-apron 100, and thereupon the said nozzle will be depressed in order to deliver the wrapper to said apron.

As above described, at the time when the nozzle 161 is to deliver the wrapper to the apron 100 the air-suction will be turned on the apron and cut off from the nozzle, thus permitting the transfer of the wrapper in its distended condition from the nozzle to the apron. Upon one side of the wrapper-carrier 153 are provided a plunger 163 and traveling pasting-belt 164, the latter passing over the roller 165 at the outer end of the said plunger and over the roller 166, located within the paste-receptacle 167, within which, in addition to the paste, will be provided a brush 168, whose bristles will bear upon the belt 164 while passing over the roller 166 and prevent any surplus of the paste being carried from the receptacle by the said belt.

Upon the lower portion of the plunger 163 is provided a pad 169, which is between the folds of the said belt 164, as illustrated in Figs. 21 and 23, and the purpose of which is, when the plunger 163 is depressed, to move the lower portion of the belt 164 against the edge of the wrapper upon the die 162 in order to apply the paste thereto in the manner described in my aforesaid pending application.

The oscillating wrapper-carrier 153 carries the pivoted levers 170 and 171, the former being at its outer end connected with the plunger 163 and at its inner end to the rod 172, which extends downward through the tubular rod 173 and is engaged by the lever 174, Fig. 6, which, when pressed upward, will act upon the said rod 172 and lever 170 to depress the plunger 163 and force the latter downward against the lower portion of the belt 164 to apply the paste to the edge of the wrapper. The lever 171 is connected at its outer end to the upper end of the rod 175, which extends downward through the outer end of the oscillating wrapper-carrier 153 and is secured to a cross-bar in the nozzle 161, as shown in Fig. 23, while the inner end of the said lever 171 engages the upper end of the tubular rod 173, which extends downward through the inner end of the oscillating wrapper-carrier 153, as shown in Fig. 21, and is engaged by the lever 176, Fig. 6, which, when elevated, will force the said tubular rod 173 upward, and thereby, through the lever 171, depress the nozzle 161 upon the wrapper if said nozzle is over the die 162, or upon the rolling-apron 100 if said nozzle is at that time in its rear position above said apron, as shown in Fig. 1.

The levers 170 and 171 and their connections with the nozzle 161 and plunger 163 and with the rods 172 and 173 are shown and described in my aforesaid pending application and are not sought to be specifically claimed herein.

The levers 174 and 176, Fig. 6, are bell-crank levers and may be operated by cams and rods from the main shaft 57, or by any other suitable means, as described in my aforesaid pending application for patent.

The traveling paste-belt 164 has imparted to it an intermittent movement from the gearing connected with the rigid gear-wheel 177, as fully explained in my aforesaid pending application, but it may receive its intermittent motion by any other means desired. The paste-receptacle 167 and pinions 178 and 179 are supported in a frame 180 from the wrapper-carrier 153, and hence during the oscillating motion of the carrier 153 the said receptacle and pinions will have an oscillating motion imparted to them. The present invention is not, however, limited to any special means for supporting the said receptacle or to any special gearing for imparting an intermittent motion to the said belt 164.

The nozzle 161 is pivotally mounted in the lower outer end of the carrier 153 in order that during the oscillating motion of said carrier said nozzle may be adapted to come into alignment with the die 162 and to deposit the cut wrapper transversely across the apron 100, the said nozzle having a partial rotary motion during the oscillation of the carrier 153. The nozzle 161 receives its partial rotary motion from the pivoted lever 181, carried by the carrier 153 and having a segment at each end, the segment 182 being in engagement with the rigid gear-wheel 177 and the segment 183 engaging teeth upon the outer portion of the said carrier, as described in my aforesaid pending application. Upon one side of the nozzle 161 is provided the depending plate 184, which moves rearward in advance of the wrapper carried by the said nozzle and prevents the same from being disturbed by conact with the apron 100, and at the front side of the nozzle 161 is hinged the plate 158, whose lower edge is on a parallel plane with the bottom of the said nozzle and which is adapted at the proper time to be turned outward from the side of said nozzle by means of the arm 186, secured to the said carrier 153 and having its lower bent end in position to arrest the pin 187, secured on the crank-arm 188, affixed to the pin 189, upon which said plate 185 is hinged. The two positions of the plate 185 are illustrated in Figs. 23, 24, and 25. When the nozzle 161 is lowered upon the cut wrapper, the extent of its depression is such that the plate 185 will not open from the side of said nozzle, and hence the pasted edge of the wrapper will be directly below the lower edge of the said plate 185. When, however, the nozzle 161 has moved over the rolling-apron 100 and descends to deposit the wrapper thereupon, the extent of the descent of the said nozzle 161 is such that the pin 187 will be moved firmly downward against the lower bent end of the arm 186, and the latter, arresting the same, will cause the plate 185 to turn outward from the side of the nozzle 161, as illustrated in Fig. 25. Upon the elevation of the nozzle 161 the pin 187 will leave the lower bent end of the arm 186 and the plate 185 will of its own gravity return to its position against the said nozzle. The purpose of imparting the outward movement to the plate 185 while the nozzle is depositing the cut and pasted wrapper upon the rolling-apron 100 is to so free the pasted portion of the wrapper from the nozzle that the air-suction will not fail to cause the adherence of the wrapper to the rolling-apron without tearing or disturbing the pasted edge of the wrapper. When the plate 185 turns outward, it leaves the pasted edge of the wrapper practically free of the nozzle 161, and hence the suction through the apron 100 may receive the wrapper without there being any resistance offered by the paste adhering to the nozzle. The plate 185 is not shown in my aforesaid pending application and constitutes a portion of the invention sought to be protected hereby.

The die 162 is of well-known construction and is used in connection with the rollers 190 for the purpose of cutting the wrappers in a manner familiar in this art. The said die 162 is mounted upon a table 191 at the front of the bed-plate 50 of the machine and is connected with the air-chamber 192, which, by means of a pipe 193, is connected with the main suction-pipe 147. In the pipe 193 is provided a valve 194, secured upon the pin 195, the latter having at its right-hand end an arm 196, which is connected with the rod 197, the latter passing rearward and being united with the pivoted arm 198, having a roller 199, in contact with the periphery of the cam-wheel 151, as shown in Fig. 3. A spring 200, pulling rearward on the arm 196, preserves the roller 199 in contact with the periphery of said cam 151. In the edge of the cam 151 is formed the recess 201, into which at the proper time the roller 199 will pass and permit the spring 200 to move the rod 197 rearward, and thereby effect the turning of the pin 195 and the closing of the valve 194, the latter at such time cutting off the air-suction from the die 162. This particular movement of the rod 197 to close the valve 194 occurs at the moment the nozzle 161 is depressed upon the die 162 for the purpose of elevating the cut wrapper therefrom, the purpose being to release the wrapper at the die in order that the air-suction in the carrier may lift the wrapper in its distended condition without having to tear it from the die. The valve 194 is closed only while the roller 199 is within the recess 201, and hence it will be observed that the suction is on the die 162 during the greater part of the time. The valve 194 and the mechanism for operating the same (shown in Fig. 3 and just above described) are embodied in my aforesaid pending application and are not sought to be independently claimed herein.

At the front of the rolling-apron 100 are located the devices for receiving the cigarette from said apron and trimming the ends thereof preparatory to the cigarette escaping into any suitable receptacle which may be placed below the machine to receive it, and these devices are more fully illustrated in Figs. 1 and 5 and 28 to 39, inclusive, in which it will be observed that the said devices are mounted upon the transverse shafts 203 and 204. Upon the shaft 203 is rigidly secured the rotary frame 205, consisting of a hub and the series of transverse wings 206 and 207, the said wings being arranged in pairs and forming between them the receptacles 209, each of the latter being adapted to receive and carry a cigarette. The frame 205 has an intermittent rotary motion toward the front of the machine. Upon the shaft 203, at opposite ends of the frame 205, are secured the cutters 210, which are in the form of plates and are more clearly illustrated in Figs. 30, 31, and 32. The cutters or plates 210 are rigid with the frame 205 and have a movement corresponding with that of the said frame. The periphery of the cutters 210 are provided with the recesses 211, which are in alignment with the receptacles 209, formed between the wings 206 and 207 of the frame 205, and the cigarette received from the apron 100 and resting within the receptacles 209 will be of such length that its ends will project outward through the recesses 211 in order that at the proper time the oscillating knives 212 may trim the same.

The knives 212 are secured upon the shaft 204 by and between the collars 213 and 213', as shown in detail in Figs. 36 and 37, and said knives turn rearward to meet the cigarette carried by the frame 205. The ends of the hub of the frame 205 form bearings, upon which are placed the plates 214, the latter, as illustrated in Figs. 28 and 32, being intermediate the cutters 210 and the said frame 205. The ends of the hub of the frame 205 loosely fit within the plates 214 and merely afford supports for the upper ends of the said plates, the lower ends of which are provided with the recesses 215, which pass upon the transverse rod 216 and receive support therefrom. The rod 216 overcomes any tendency on the part of the plates 214 to rotate with the frame 205. The purpose of the plates 214 is, by reason of their cam shape along their lower front edges, to force the cigarette from the receptacles 209 as the latter one after another turn downward in position to discharge the cigarettes. The operation of the plates 214 is probably most clearly illustrated in Figs. 34 and 35, and in which it will be seen that when the frame 205 has made a sufficient rotation to move the cigarette downward the plates 214 will operate to prevent the same from remaining within the receptacles 209. In many instances when the receptacles 209 reach their downward or inverted position the cigarette will of its own gravity fall therefrom; but in case, by reason of paste on the wrapper or for any other cause, the cigarette should have a tendency to remain within the receptacles 209 it will be forced therefrom by being carried against the lower front cam edge of said plates 214, the said edge being eccentric to the outline described by the frame 205.

At the front of the frame 205 are provided the standards 217, which, as illustrated in Figs. 29, 30, and 31, have a curved front edge corresponding with the circular outline of the frame 205, and these standards are, as illustrated in Fig. 28, within the vertical plane of the ends of the frame 205.

Upon the upper ends of the standards 217 are pivotally secured the plates 218, the form of which is clearly illustrated in Figs. 33, 34, and 35. The plates 218 are loose upon the rod 219, connecting the upper ends of the standards 217, and their initial position is that illustrated in Fig. 34, the said plates hanging vertically downward. Upon the rod 219 is provided a weak spring 220, as shown in Fig. 28, which retains the plates 219 in close relation to the standards 217.

It will be observed upon reference to Fig. 28 that the ends of the wings 206 and 207 of the frame 205 are provided with recesses, which pass over the standards 217 and plates 218 and permit of said standards and plates being in close relation to that portion of the receptacles 209 usually containing the cigarette. The recesses in the wings 207 are not so deep as the recesses in the wings 206, as shown in Fig. 33, and hence when the wings 207 strike the plates 218 the latter are moved outward to permit said wings 207 to pass, as indicated by solid lines in Fig. 33, and thereafter said plates 218 swing inward again and come over the cigarette to be trimmed. The wings 206 do not move the plates 218 outward, owing to the greater depth of their recesses. During the revolving motion of the frame 205 toward the front of the machine the cigarette is carried to the position in which it is illustrated in Fig. 35, and upon reaching this position the knives 212 descend to trim the ends of the cigarette, and just prior to the descent of the said knives the plates 218, after having been pushed frontward slightly by the edges of the wings, Fig. 33, return to their initial position and pass directly over the cigarette, as shown in Fig. 35, whereby the said plates 218 are enabled to hold the cigarette down within the lower part of the receptacles 209 and against the edges of the recesses 211 in the cutters 210, the purpose of this operation being to enable the knives 212 to co-operate with the said cutters 210 in the trimming of the ends of the cigarette and to permit the return of the knives 212 to their upward position without the liability of the cigarette sticking to and being elevated by them, the plates 218 preventing any upward movement in the cigarette while the knives 212 are ascending.

Centrally in front and extending partly below the frame 205 are secured the plates 221, which curve downward and rearward, as illustrated in Figs. 28, 34, and 35, and serve to retain the cigarettes well into the receptacles 209 of the frame 205 while on their way to the point of discharge. The central portion of the edges of the wings 206 and 207 are recessed, as illustrated in Fig. 28, in order that the said wings may pass over the said plates 221 without contacting with them. The recesses just referred to in the wings 206 and 207 permit the edges of the plates 221 to extend a definite distance into the receptacles 209, and thus enable said plates to prevent the cigarettes from escaping from said receptacles prior to the proper time. The frame 205 has, as above described, an intermittent rotary motion toward the front of the machine, and since said frame is provided with four of the receptacles 209 it will be positively stopped at the end of each one-quarter revolution.

Upon the shaft 204 are provided the pawl 222 and segment 223, as shown in Fig. 28, the said pawl and segment being provided with collars fitted upon the end of said shaft 204. The pawl 222 engages the ratchet 224, secured upon the end of the shaft 203, and the segment 223 is in engagement with the segment 225, also secured upon the shaft 203 and connected by the arm 226 with the rod 227, to which motion is applied, as hereinafter described, and which when moving forward will cause a downward motion in the segment 225 and, through the segment 223 and shaft 204, impart a downward movement to the knives 212 for the purpose of trimming the cigarette. The rearward motion of the connecting-rod 227 will result in the segment 225 moving upward and, through the segment 223 and shaft 204, elevating the knives 212. The pawl 222 acts in connection with the ratchet 224 as a stop to restrain the forward rotation of the shaft 203 and frame 205 at the end of each one-quarter revolution of the same, and in order at the proper time to free the said pawl 222 from the ratchet 224 a pin 226 has been provided upon the face of the segment 223, as illustrated in Figs. 29 and 31, which pin during the upward motion of the segment 223, which occurs with the frontward motion of the rod 227, will ascend against the pawl 222, as illustrated in Fig. 31, and elevate the said pawl free of the ratchet 224. The position of the pawl 222 while acting as a stop to prevent further rotation in the shaft 203 and frame 205 is illustrated in Fig. 30, while in Fig. 31 the pawl is shown in its elevated position free of the ratchet 224, and in Fig. 29 the pawl is shown in the position to which it falls of its own specific gravity when the segment 223 is moved downward to restore the knives 212 from the extreme frontward position, in which they are illustrated in Fig. 31, to their substantially vertical position illustrated in Fig. 29. As may be seen upon reference to Fig. 29, the pawl 222 when allowed to descend by the receding pin 226 will not interfere with the shaft 203 completing its one-quarter revolution, but will check said shaft at the end of its one-quarter revolution.

The shaft 204, it will be understood from the foregoing description, receives its oscillating motion from the segments 223 and 225, and the knives 212, being rigidly secured upon said shaft, will have a movement corresponding with that thereof.

The shaft 203 receives its motion from the ratchet mechanism illustrated in Figs. 38 and 39, in which 228 denotes a ratchet rigidly secured upon the end of the shaft 203 and engaged by the pawl 229, pivoted upon the knuckle 230, whose lower end turns freely by means of a collar upon the shaft 203, while its upper end, which is in the form of a crank, is connected with the actuating-rod 231. The rod 231 has a frontward and backward motion, and its different positions are illustrated by full and dotted lines in Figs. 38 and 39.

In Fig. 39 the position of the knuckle 230 and pawl 229 when the rod 231 moves rearward is shown by dotted lines, and it will be observed that while the knuckle 230 and pawl 229 are making their rearward movement to re-engage the ratchet 228 the latter and the shaft 203 are prevented from having any reverse rotation by means of the ordinary stop-pawl 232, whose engaging end is preserved in contact with the teeth of the said ratchet by means of the coiled spring 233. The pawl 232 simply acts as a stop or check to prevent any reverse rotation in the pawl 228 and the elements connected with the shaft 203. When the rod 231 is moved frontward from the position in which it is illustrated by dotted lines in Fig. 29, the pawl 229 will operate against the ratchet 228 to impart to the shaft 203 and frame 205 a revolving motion toward the front of the machine, the said shaft and frame at the end of its one-quarter revolution being, as above described, checked by means of the pawl 222 engaging the ratchet 224.

The rods 227 and 231, whose motion operates, respectively, the shafts 204 and 203 through the intermediate mechanism above referred to, receive their motion from the main driving-shaft through the medium of the cam 234 thereon, the said cam being illustrated in Figs. 7 and 8 and the manner of its action upon the said rods 227 and 231 being illustrated by dotted lines in Fig. 2 and full lines in Fig. 5. The rods 227 and 231 extend downward and rearward and are pivotally secured to arms 235, which swing from the auxiliary shaft, as shown in Figs. 5 and 7, and are provided with the rearwardly-projecting arms 236, which engage the opposite sides of the said cam 234, the grooves in the latter acting upon the arms 236 to impart the proper reciprocating motion to the rods 227 and 231 for effecting the rotation of the shaft 203 and the oscillating movement in the shaft 204. The exact motion imparted to the frame 205 is as follows, commencing from the moment when the frame has one of its receptacles 209 in the position in which it is illustrated in Fig. 35, at which it will be seen that the upper receptacle 209 is adjacent to the front edge of the rolling-table and in position to receive the cigarette when rolled by the apron 100 therefrom: It may be assumed that the cigarette has been rolled into the receptacle 209 adjacent to the rolling-table. The first movement imparted to the frame 205 causes the latter to turn forward about one-eighth of a revolution, thereby permitting the rear wing 206 to wipe the cigarette from the apron 100 in case the same has adhered to the latter instead of freely falling therefrom. This slight or about one-eighth revolution of the frame 205 occurs immediately at the conclusion of the rolling operation of the apron 100 and just before the apron starts to return to its rearward position, (shown in Fig. 1,) and thereupon the apron immediately returning to its rearward position the frame 205 continues its revolution until it has made its one-quarter turn and brought the cigarette to the position in which it is illustrated at the upper right-hand side of Fig. 35, where the said frame becomes arrested and the plates 218 pass over the cigarette. At this time another receptacle 209 is in position to receive the next cigarette rolled by the apron 100 and the rod 227 makes its forward thrust, carrying the knives 212 from the position in which they are illustrated in Fig. 34 downward to the position in which they are illustrated in Fig. 35, thereby causing the said knives, in connection with the cutters 210, to trim the ends of the cigarette, the said knives 212 returning immediately to their extreme forward position. (Illustrated in Fig. 31.) This movement of the knives 212 to the extreme position (illustrated in Fig. 31) is simply to permit the pin 226 to lift the pawl 222 from the ratchet 224 in order that the rod 231 may be enabled to immediately cause the frame 205 to have a further revolution toward the front, since at such time another cigarette has fallen from the apron 100. The knives 212 only remain momentarily in their extreme frontward position (shown in Fig. 31) and quickly return to their substantially vertical position. (Shown in Figs. 29 and 34.) After the knives 212 have ascended to their extreme frontward position (shown in Fig. 31) and the shaft 203 has made a sufficient rotation to permit the pin 226 to recede from the pawl 222 the timing of the cam 234 is such that the knives 212 are, as above described, returned to a substantially vertical position, and the continued motion of the frame 205 to complete its second quarter-revolution carries the trimmed cigarette downward along the plates 221 to the position shown in the lower part of Fig. 35, while the second cigarette reaches the position in which its ends are to be trimmed and the knives 212 descend to complete the trimming operation. As each cigarette is trimmed, an empty receptacle 209 is in position to receive the succeeding cigarette from the apron 100, and as each cigarette falls from the buckets 209 at the lower side of the frame 205 another cigarette is in position to be trimmed. As above described, the frame 205 has an intermittent forward rotation, each full movement being a one-quarter revolution. As each cigarette falls from the apron 100 into the open receptacle, the frame 205 immediately makes a part of its one-quarter revolution, moving from the position shown in Fig. 35 to that illustrated in Fig. 34, this temporary movement being to effect the removal of the cigarette from the apron in case it adheres thereto, and the frame 205 then temporarily rests until the apron has returned to its rearward position, whereupon the apron being out of the way the frame 205 completes its one-quarter movement.

The operation of the various parts of the machine has been so fully described hereinbefore, in connection with the explanation of the construction of said parts, that it is believed a further detailed description of the operation of the machine is unnecessary.

The filler-tobacco will be comparatively smoothly and uniformly spread upon the feeding-belt 51 and by said belt carried forward to the roller 56, whence it will pass through the throat 76 to the shuttle 77, the forward feed of the tobacco being accomplished by intermittent movements and the charges of the tobacco for the individual cigarettes being severed by the knife 78. The charges of tobacco severed by the knife 78 fall upon the lower plate 90 of the shuttle 77, the latter always being in its open position in line with the feed-belt 51 during the descent of the knife 78. The charges of filler-tobacco severed by the knife 78 are carried to the rolling-apron 100 by the said shuttle 77 in the manner hereinbefore described, the shuttle having a reciprocating movement from the feed-belt to the rolling-apron and back to the feed-belt, and having also a partial rotary motion while over the rolling-apron 100, in order that the charge of filler-tobacco may be released from the same and fall upon the said apron in the rear of the cut wrapper deposited thereon by the pneumatic wrapper-carrier 153. After the shuttle 77 has deposited its charge of tobacco upon the rolling-apron 100 and returned to the right in line with the feeding-belt 51 the roller 117 and carriage 118 start forward to roll the cigarette, and on their forward movement the carriage 118, acting through the rod 154, will force the pneumatic wrapper-carrier 153 to its forward position, whereby the nozzle 161 is brought into alignment with the cutting-die 162 preparatory to taking the wrapper therefrom for the next succeeding cigarette to be rolled. During the forward motion of the roller 117 the loop is formed in the apron 100 in a well-known manner and the said loop is drawn down to size against the pressure of the blade 120 in the manner described in my aforesaid pending application for patent, the size of the loop in the apron after once having been reduced to the desired extent being retained throughout the remaining portion of the forward travel of the roller 117. When the roller 117 and carriage 188 have traveled forward until the stop 130 on the rod 127 reaches the rigid stop 132, the loop in the apron can be no further reduced in size, since the said rigid stop 132 will take the force of the weight 134, and thus prevent the latter from retarding the forward motion of the carriage 119, the said carriage 119 and carriage 118, after the stop 130 is in contact with the rigid stop 132, having a simultaneous forward travel, as described in my aforesaid pending application. Upon the force of the weight 134 coming upon the stop 132 of the carriage 118 the downward pressure exerted by the weight 137 through the gear-wheel 138 and rack 140 comes upon the carriage 118 and serves to aid the same in its forward motion, whereby the downward travel of the weight 137 is utilized to counterbalance the upward force necessary to elevate the weight 134.

It has been explained hereinbefore that the weight 137 descends while the weight 134 elevates and that the weight 134 descends during the elevation of the weight 137. A wrapper is cut upon the die 162 during the forward travel of the roller 117 and pneumatic wrapper-carrier 153 in order that upon the latter reaching its forward position the plunger 163 may descend against the belt 164 and cause thereby a line of paste to be deposited upon the edge of the wrapper upon the die 162, and thereafter the nozzle 161 descends upon the cut wrapper, thus receiving the line of paste preparatory to carrying the same rearward to the rolling-apron upon the succeeding rearward travel of the roller 117. With each forward motion of the roller 117 a cigarette is rolled by the apron 100 and caused to fall into one of the receptacles 209 of the frame 205, and with each forward movement of the roller 117 a cut wrapper on the die 162 receives its paste and is taken up by the nozzle 161 of the carrier 153, and with each rearward motion of the roller 117 the apron 100 is smoothly spread upon its table and the wrapper taken from the die 162 by the nozzle 161 is deposited upon the perforated portion of said apron. At the termination of each rearward motion of the roller 117 the shuttle 77 travels to the left and deposits a charge of tobacco upon the apron 100 in rear of the wrapper. The cigarette rolled from the apron 100 with each forward motion of the roller 117 is slightly longer than the usual commercial length, and the cigarette thus formed falls, as above described, into the receptacles 209 of the frame 205, its opposite ends projecting beyond the opposite ends of said frame and beyond the vertical plane of the cutter-blades 210, carried at the ends of said frame. The cigarettes entering the pockets or receptacles 209 are carried forward and downward, as hereinbefore explained, at the end of each full one-quarter revolution of the frame 205, a cigarette being trimmed by the descending knives 212, after which, during the succeeding movements of the frame 205, the cigarettes are carried downward and allowed to escape from the receptacles 209 upon any suitable chute or into any suitable receptacle which may be provided for the purpose. The mechanisms for imparting motion to the frame 205 and to the knives 212 have been sufficiently explained as to their construction and operation hereinbefore.

The leaf of tobacco is held upon the die 162 by air-suction during the cutting of the wrapper, and the latter is held by said air-suction during the pasting operation of the belt 164 and until the nozzle 161 has descended upon the die 162, whereupon the air-suction will be cut off from the die 162 and turned upon the nozzle 161, thereby permitting the latter to elevate the cut wrapper in its distended condition and convey it to the perforated portion of the rolling-apron 100, upon which the nozzle 161 will descend, and the air being at that moment cut off from the said nozzle and turned upon the said apron the latter will take the wrapper from the nozzle and retain it in its even distended condition preparatory to the rolling of the same around the filler-tobacco. As above described, during the descent of the nozzle 161 for the purpose of depositing the wrapper upon the apron 100 the plate 185 will, owing to the position of the stop 186, be turned outward from the pasted edge of the cut wrapper, thus facilitating the depositing of the latter upon the apron 100.

The capacity of the machine hereinbefore described is governed to a large extent by the operator's ability to cut the wrappers for the cigarettes, and experience has demonstrated that a skilled operator is able usually to cut about five thousand wrappers in a day of ten hours. Hence the usual capacity of the machine is about five thousand cigarettes a day, although it will be understood that with greater speed on the part of the operator in cutting the wrappers the capacity of the machine will be increased.

The machine forming the subject of this application has been in continuous use for a considerable period of time manufacturing cigarettes for the market.

The invention is not limited to the details of construction except as specifically pointed out in the claims, and the machine shown and described may be modified as to its mechanical details in many particulars without departing from the spirit of the invention.

What I claim as my invention, and desire to secure by Letters Patent, is—

1. In a cigarette making machine the feed belt for filler tobacco, and pawl and ratchet mechanism for imparting an intermittent motion to said belt, combined with a plate adjacent to said ratchet and pawl, and an adjusting screw connected with said plate whereby the position of the latter may be varied to govern the contact of the said pawl with the said ratchet; substantially as set forth.

2. A cigarette making machine comprising in its structure the feed belt for filler tobacco, and pawl and ratchet mechanism for imparting to said belt an intermittent motion, combined with an adjusting screw and plate for governing the movement of the said ratchet; substantially as set forth.

3. A cigarette making machine comprising in its structure the feed belt for filler tobacco, and pawl and ratchet mechanism for imparting to said belt an intermittent motion, combined with the plate adjacent to said ratchet and having its upper edge eccentric to the periphery thereof, and the adjusting screw connected at its lower end with said plate and at its other end provided with means for rotating the screw and locking the screw in its adjusted position; substantially as set forth.

4. A cigarette making machine comprising the feed belt for filler tobacco, and pawl and ratchet mechanism for imparting to said belt an intermittent motion, combined with the plate adjacent to said ratchet and having its upper edge eccentric to the periphery thereof, the block secured to said plate, the adjusting screw connected to said block, means for adjusting said screw and locking the same in its adjusted position, and the guide for the said block; substantially as set forth.

5. In a cigarette making machine, the feed belt having an intermittent motion, the knife for severing the charges of tobacco, and rolling mechanism, combined with the shuttle adapted to travel between said feed belt and said rolling mechanism and to convey the severed charges of filler tobacco to the latter the revoluble shaft carrying said shuttle, the said shuttle comprising the lower plate mounted upon said shaft, the upper plate hinged upon said shaft, means for preventing the upper plate from closing too tightly upon the lower plate, and means for arresting the upper plate while the lower plate travels from the same to release the charge of tobacco and permit it to descend to the rolling mechanism; substantially as set forth.

6. In a cigarette making machine having an intermittent feed belt and rolling mechanism, the reciprocating shuttle comprising the lower and upper plates, the reciprocating shaft upon which said plates are mounted, the spring for closing the upper plate of the shuttle, and the arm carried by the said upper plate, combined with the cam in line with said feed belt and adapted to contact with said arm and open the shuttle, and means for reciprocating the said shuttle and its supporting shaft and turning the same to permit the escape of the severed charge of filler tobacco; substantially as set forth.

7. In a cigarette making machine having the feed belt and rolling mechanism, the reciprocating shuttle comprising the lower and upper plates, the shaft upon which said plates are secured and which is adapted to have a rotary as well as a reciprocating movement, and the spring for closing the upper plate of the shuttle, combined with the cam adapted to open said upper plate when the shuttle is in line with the feed belt, the stud secured upon the upper plate of the shuttle, and the rigid stop in the path of said stud to arrest the said upper plate when the lower plate of the shuttle turns to its full extent downward to release the severed charge of tobacco; substantially as set forth.

8. In a cigarette making machine having a feed belt and rolling mechanism, the reciprocating shuttle 77 adapted to convey the severed charges of tobacco from the feed to the rolling mechanism and comprising the lower and upper plates mounted upon a reciprocating shaft, combined with the spring adapted to close said upper plate of the shuttle, the sleeve 114 connected with said upper plate, the bolt 113 passing through said sleeve, the roller 112 on said bolt, the cam adapted to contact with said roller at the end of the traveling movement of the shuttle toward the feeding mechanism, and means for adjusting the lower plate of said shuttle upon its supporting shaft; substantially as set forth.

9. In a cigarette making machine the rolling apron, the roller at one end of said apron, the main reciprocating carriage carrying said roller, and the auxiliary carriage having the presser blade and mounted on said main carriage, combined with the rod connected with said auxiliary carriage and having the chain and weight, the stop on said rod, the stops upon said main carriage between which the stop on the rod travels, the main gear and rack for imparting a reciprocating movement to said main carriage, the auxiliary gear and rack adjacent to the main gear and rack and engaging said main carriage, and the chain and weight connected to the auxiliary gear; substantially as and for the purposes set forth.

10. In a cigarette making machine the rolling apron, the main carriage carrying a roller connected with said apron, the auxiliary carriage mounted upon said main carriage and provided with the presser blade, the rod provided with the spring and weight connected with said auxiliary carriage, a stop on the main carriage to arrest said rod when the loop in the apron is drawn down to size by the said blade, the gear wheel 138, the chain and weight connected to said gear wheel, the stud 142 on said gear wheel, the tram-way 139 to engage said stud, and the rack 140 upon the said main carriage and adapted to be engaged by said gear wheel 138; substantially as set forth.

11. In a cigarette making machine the rolling mechanism, combined with the pneumatic wrapper carrier adapted to deliver the cut wrappers from the wrapper table to said rolling mechanism, means for applying paste to the edge of the wrappers prior to their being taken by the wrapper carrier, the perforated nozzle at the outer end of said carrier, the plate hinged upon said nozzle, and means for turning said plate outward upon the depression of said nozzle to deliver the wrapper to the rolling apron; substantially as set forth.

12. In a cigarette making machine the rolling apron for rolling the cigarette, and the die for cutting the wrapper therefor, combined with the traveling wrapper carrier having the perforated nozzle at its end, air suction apparatus connected with said carrier, the plate hinged upon the said nozzle, means for applying paste to the edge of the wrapper while on said die, and means for turning said plate outward from said nozzle upon the depression of the latter to deliver the wrapper to said apron; substantially as set forth.

13. In a cigarette making machine the rolling apron, the die for cutting the wrapper, and mechanism for applying paste to the edge of the cut wrappers, combined with the nozzle having a perforated lower face and adapted to convey the cut wrappers from the said die to the said apron, the hinged plate upon one side of said nozzle, means for turning said plate outward from the nozzle upon the descent of the latter to deposit the wrapper upon said apron, and the plate upon the opposite side of the said nozzle for protecting the wrapper from contact with the apron during the travel of the nozzle to its point of delivery; substantially as set forth.

14. In a cigarette making machine the rolling apron, the die for cutting the wrappers, and mechanism for applying paste to the edge of the cut wrappers, combined with the nozzle having a perforated lower face and adapted to convey the cut wrappers from the said die to the said apron, the hinged plate upon one side of said nozzle, and having the stud, and the rigid arm adapted to arrest said stud on said plate during the descent of the said nozzle; substantially as and for the purposes set forth.

15. In a cigarette making machine the rolling mechanism for rolling the cigarettes, combined with the revoluble frame having the receptacles to receive the cigarettes from the rolling mechanism, means for imparting to said frame an intermittent motion, the knives for trimming the ends of said cigarettes while held in said frame, and the pivoted plates adapted to swing upon the cigarettes while in position for trimming and hold the same against upward movement; substantially as set forth.

16. In a cigarette making machine the rolling mechanism for rolling the cigarettes, combined with the revoluble frame having receptacles to receive the cigarettes from said rolling mechanism, the oscillating knives for trimming the ends of the cigarettes, and the stationary plates adjacent to the ends of said frame and having their edges eccentric to the circular outline of said frame whereby during the revolving motion of the latter the said plates will force the cigarettes from said pockets; substantially as set forth.

17. In a cigarette making machine the rolling mechanism for rolling the cigarettes, combined with the revoluble frame having receptacles to receive the cigarettes from the said rolling mechanism, the cutter plates secured upon the ends of said frame and having recesses in line with the receptacles thereof, the plates intermediate said cutter plates and the ends of said frame for forcing the trimmed cigarettes from said receptacles, and the oscillating knives for trimming the ends of the cigarettes; substantially as set forth.

18. In a cigarette making machine the rolling mechanism for rolling the cigarettes, combined with the revoluble frame composed of the hub and wings, the latter forming receptacles to receive the cigarettes and the said wings being recessed at their ends, the pivoted plates supported adjacent to the ends and in front of said frame and in line with said recesses, mechanism for imparting to said frame an intermittent rotary motion, the oscillating knives for trimming the ends of the cigarettes and mechanism for imparting the oscillating motion to said knives; substantially as set forth.

19. In a cigarette making machine, the mechanism for rolling the cigarettes, combined with the revoluble frame 205 having receptacles to receive the cigarettes from said mechanism, the shaft 203 upon which said frame is mounted, mechanism for imparting to said shaft an intermittent motion from the main driving shaft, a stop for arresting said shaft 203 at definite periods, the shaft 204, the knives 212 on said shaft 204, and mechanism for oscillating said shaft 204 and knives 212 and timed with the mechanism operating said frame 205; substantially as set forth.

20. In a cigarette making machine, the mechanism for rolling the cigarettes, combined with the revoluble frame 205 having receptacles to receive the cigarettes from said mechanism, the shaft 203 upon which said frame is mounted, the ratchet 228 on said shaft, the arm carrying the pawl in engagement with said ratchet, mechanism leading from the driving shaft to said arm, the ratchet 224 on said shaft 203, the pawl 222 engaging said ratchet 224, the shaft 204, the knives on said shaft 204, the segment 223 on said shaft 204 and having the stud 226 below said pawl 222, the segment 225 in engagement with said segment 223, and mechanism for operating said segment 225 from the main driving shaft; substantially as set forth.

Signed at the city of New York, in the county and State of New York, this 6th day of April, 1895.

JOHN R. WILLIAMS.

Witnesses:
  CHAS. C. GILL,
  EDWARD D. MILLER.